(12) United States Patent
Omori

(10) Patent No.: US 11,940,005 B2
(45) Date of Patent: Mar. 26, 2024

(54) RADIAL FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 144 days.

(21) Appl. No.: 17/487,954

(22) Filed: Sep. 28, 2021

(65) Prior Publication Data

US 2022/0010834 A1    Jan. 13, 2022

Related U.S. Application Data

(63) Continuation of application No. PCT/JP2020/004913, filed on Feb. 7, 2020.

(30) Foreign Application Priority Data

Apr. 4, 2019 (JP) .................................. 2019-072075

(51) Int. Cl.
*F16C 17/02* (2006.01)
*F16C 27/02* (2006.01)

(52) U.S. Cl.
CPC ............ *F16C 17/024* (2013.01); *F16C 27/02* (2013.01)

(58) Field of Classification Search
CPC .................................................. F16C 17/024
See application file for complete search history.

(56) References Cited

U.S. PATENT DOCUMENTS

| | | | |
|---|---|---|---|
| 5,634,723 A * | 6/1997 | Agrawal | F16C 17/024 384/106 |
| 6,698,930 B2 * | 3/2004 | Akizuki | F16C 27/02 384/106 |
| 11,306,772 B2 * | 4/2022 | Omori | F16C 17/024 |
| 2012/0281936 A1 | 11/2012 | Heshmat et al. | |
| 2020/0124087 A1 | 4/2020 | Omori | |
| 2020/0224713 A1 | 7/2020 | Omori | |
| 2022/0186774 A1 * | 6/2022 | Pye | F16C 27/02 |

FOREIGN PATENT DOCUMENTS

| | | |
|---|---|---|
| EP | 2767722 A1 | 8/2014 |
| EP | 2876316 A | 5/2015 |
| EP | 3931454 A1 | 1/2022 |
| JP | 2009-185857 A | 8/2009 |
| JP | 2011-144846 A | 7/2011 |
| JP | 2013-87789 A | 5/2013 |
| JP | 2014-020463 A | 2/2014 |
| WO | 2018-168932 A1 | 9/2018 |
| WO | 2019/004278 A1 | 1/2019 |
| WO | 2020/192874 A1 | 10/2020 |

* cited by examiner

*Primary Examiner* — James Pilkington
(74) *Attorney, Agent, or Firm* — Rothwell, Figg, Ernst & Manbeck, P.C.

(57) ABSTRACT

A radial foil bearing includes a bearing housing which has an insertion hole therein, a top foil which is disposed inside the insertion hole, and a foil structure which is interposed between the top foil and the bearing housing, the foil structure has a folded protruding portion that is bent outward in a radial direction of the insertion hole and is bent back inward in the radial direction, and the folded protruding portion is fitted to a fitting groove formed in an end surface of the bearing housing in an axial direction, the axial direction being a direction in which the insertion hole extends.

9 Claims, 23 Drawing Sheets

RADIAL FOIL BEARING

CROSS-REFERENCE TO RELATED APPLICATIONS

This application is a Continuation Application based on International Application No. PCT/JP2020/004913, filed Feb. 7, 2020, which claims priority on Japanese Patent Application No. 2019-072075, filed Apr. 4, 2019, the contents of which are incorporated herein by reference.

TECHNICAL FIELD

The present disclosure relates to a radial foil bearing.

BACKGROUND

Conventionally, as a bearing for a high-speed rotating body, a radial bearing that encloses a rotary shaft and is used is known. As such a radial bearing, a radial foil bearing including a thin plate-shaped top foil that forms a bearing surface, a back foil that elastically supports the top foil, and a cylindrical bearing housing that houses the top foil and the back foil is well known. As the back foil of the radial foil bearing, a bump foil obtained by forming a thin plate into a corrugated plate shape is mainly used.

In a radial foil bearing described in Patent Document 1 below, in order to prevent a back foil from coming off a bearing housing, engaging notches which extend from an inner peripheral edge of the bearing housing toward an outer peripheral edge thereof are formed in both side surfaces of the bearing housing, and engaging protrusion pieces which engage with the engaging notches are provided at both end portions of the back foil on one side in a circumferential direction of the bearing housing.

DOCUMENT OF RELATED ART

Patent Document

[Patent Document 1] Japanese Unexamined Patent Application, First Publication No. 2013-87789

SUMMARY

In such a radial foil bearing, by causing energy dissipation through foil friction (for example, friction between foils or friction between the foil and the bearing housing) or the like, fluctuations in the thickness of a fluid lubrication film can be attenuated, shaft vibration (self-excited vibration) of a rotary shaft can be prevented, and thereby the shaft vibration can be likely to be contained.

An object of the present disclosure is to improve a damping effect attributable to foil friction.

A radial foil bearing according to an aspect of the present disclosure includes a bearing housing which has an insertion hole therein, a top foil which is disposed inside the insertion hole, and a foil structure which is interposed between the top foil and the bearing housing, in which the foil structure has a folded protruding portion that is bent outward in a radial direction of the insertion hole and is bent back inward in the radial direction, and the folded protruding portion is fitted to a fitting groove formed in an end surface of the bearing housing in an axial direction, the axial direction being a direction in which the insertion hole extends.

In the radial foil bearing according to the aspect, the folded protruding portion may be provided at each of end edges of the foil structure on both sides in the axial direction.

In the radial foil bearing according to the aspect, the foil structure may have a hole portion provided between the folded protruding portions formed at the end edges on both sides in the axial direction.

In the radial foil bearing according to the aspect, the foil structure may be formed by a plurality of foil pieces disposed in a circumferential direction of the insertion hole, the folded protruding portion may be provided at each of adjacent foil pieces of the plurality of foil pieces adjacent to each other in the circumferential direction, and the folded protruding portions adjacent to each other in the circumferential direction may be disposed in one fitting groove in a state where the folded protruding portions face each other.

In the radial foil bearing according to the aspect, the foil structure may include a back foil disposed along an inner peripheral surface of the insertion hole, and an intermediate foil that is supported by the back foil and is in contact with the top foil, the intermediate foil may have the folded protruding portion, and a notch through which the folded protruding portion passes may be formed in the back foil.

In the radial foil bearing according to the aspect, the foil structure may include a back foil disposed along an inner peripheral surface of the insertion hole, and an intermediate foil that is supported by the back foil and is in contact with the top foil, the back foil may have the folded protruding portion, and the intermediate foil may have a second folded protruding portion fitted to a space inside the folded protruding portion of the back foil.

In the radial foil bearing according to the aspect, the intermediate foil may have a hole portion, and an overhanging piece that overhangs to a back foil side from an opening end of the hole portion in a circumferential direction toward a middle portion of the hole portion in the circumferential direction.

According to the present disclosure, a damping effect attributable to foil friction can be improved.

DESCRIPTION OF EMBODIMENTS

Hereinafter, a radial foil bearing of the present disclosure will be described in detail with reference to the drawings.

Figure 1:
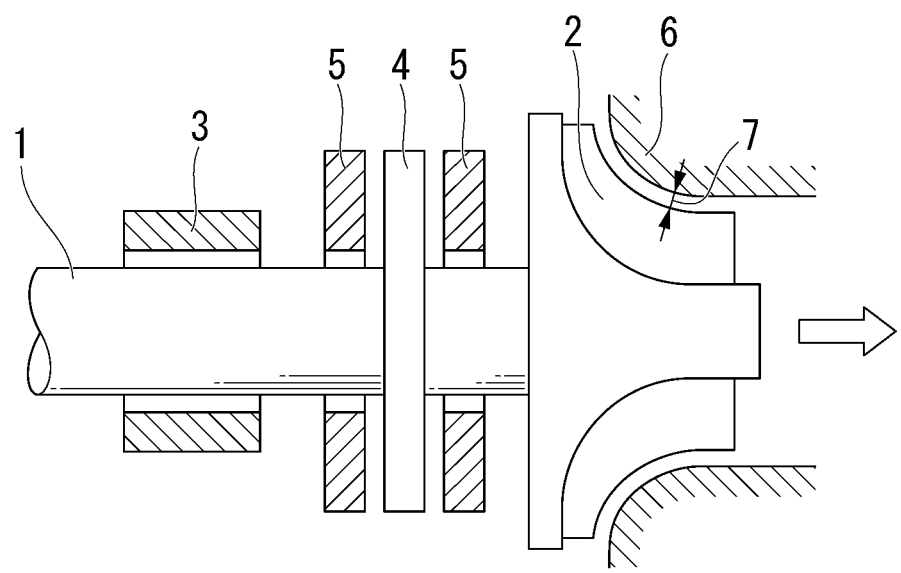
FIG. 1 is a side view showing an example of a turbomachine to which a radial foil bearing of the present disclosure is applied.

FIG. 1 is a side view showing an example of a turbomachine to which the radial foil bearing of the present disclosure is applied.

In FIG. 1, a reference sign 1 represents a rotary shaft (shaft), a reference sign 2 represents an impeller provided at a tip of the rotary shaft on one side in an axial direction, and a reference sign 3 represents the radial foil bearing according to the present disclosure. Although only one radial foil bearing is shown in FIG. 1 for the sake of simplicity, normally two radial foil bearings are provided in the axial direction of the rotary shaft 1. Therefore, two radial foil bearings 3 are provided also in the present disclosure.

The radial foil bearing 3 encloses the rotary shaft 1. That is, the rotary shaft 1 is inserted through the radial foil bearing 3. A thrust collar 4 is provided between the impeller 2 of the rotary shaft 1 and the radial foil bearing 3. Thrust bearings 5 are disposed on both sides of the thrust collar 4 in the axial direction. That is, the rotary shaft 1 is inserted through the thrust bearings 5. The impeller 2 is disposed in a housing 6, which is a stationary side, and a tip clearance 7 is formed between the housing 6 and the impeller 2.

First Embodiment

Figure 2:
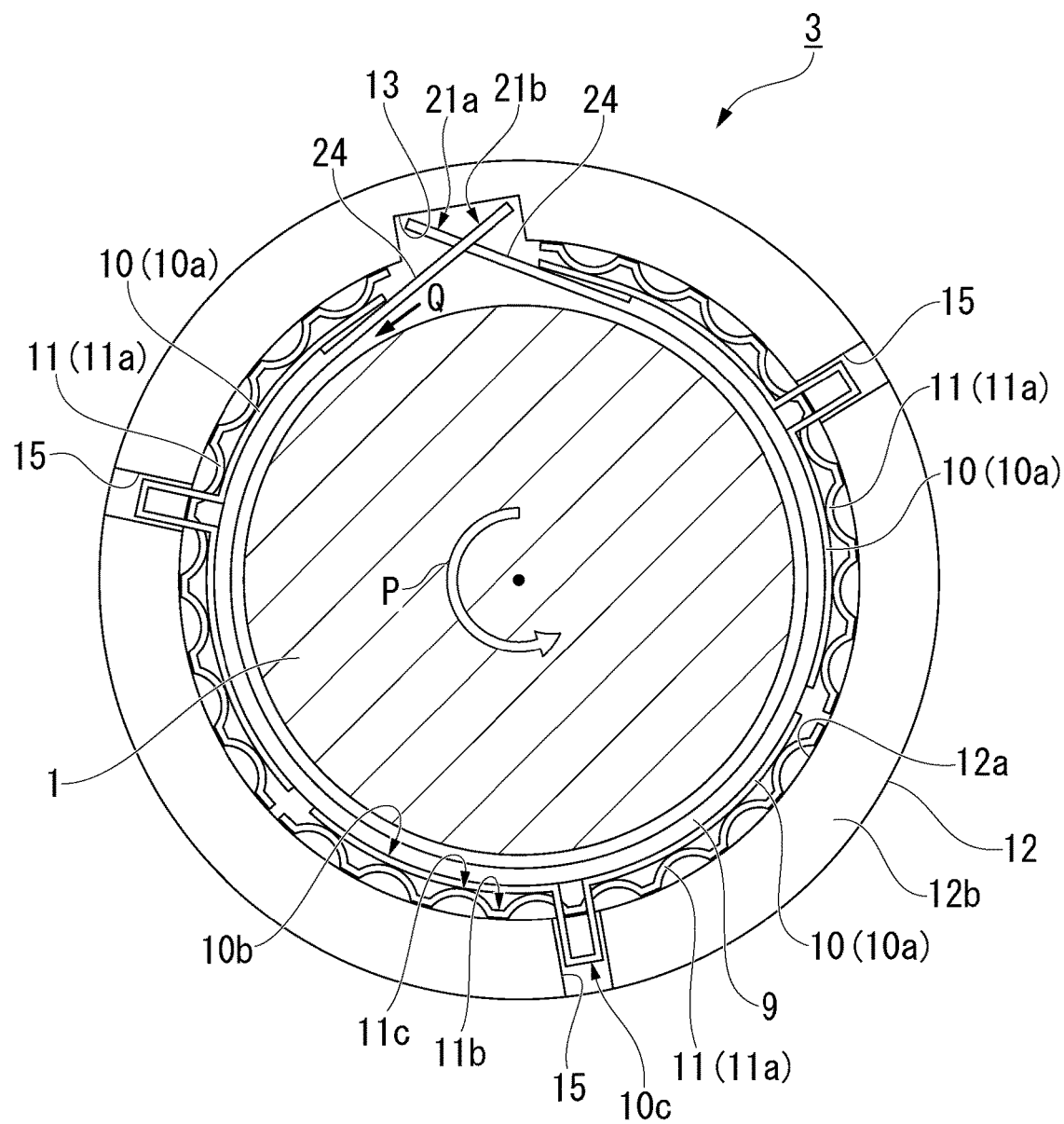
FIG. 2 is a front view showing a radial foil bearing according to a first embodiment of the present disclosure.

FIG. 2 is a front view showing the radial foil bearing 3 according to a first embodiment of the present disclosure.

The radial foil bearing 3 encloses the rotary shaft 1 and supports the rotary shaft 1. The radial foil bearing 3 includes a top foil 9, an intermediate foil 10 (foil structure), a back foil 11 (foil structure), and a bearing housing 12. The bearing housing 12 has an insertion hole 12a through which the rotary shaft 1 is inserted.

In the following description, a positional relationship between respective members may be described with the insertion hole 12a as reference. Specifically, an "axial direction" refers to a direction in which the insertion hole 12a extends (i.e., refers to a direction in which the rotary shaft 1 is inserted). In addition, a "radial direction" refers to a radial direction of the insertion hole 12a. In addition, a "circumferential direction" refers to a circumferential direction along an inner peripheral surface of the insertion hole 12a.

The bearing housing 12 is a cylindrical member that configures an outermost portion of the radial foil bearing 3 in the radial direction. The insertion hole 12a is formed in the bearing housing 12. The back foil 11, the intermediate foil 10, and the top foil 9 are housed in the insertion hole 12a. Specifically, the back foil 11 is supported by the inner peripheral surface of the insertion hole 12a. The intermediate foil 10 is supported by the back foil 11. The top foil 9 is supported by the intermediate foil 10. That is, the intermediate foil 10 and the back foil 11 serves as a foil structure interposed between the top foil 9 and the bearing housing 12. The bearing housing 12 of the present disclosure is a cylindrical member including the insertion hole 12a. However, the bearing housing 12 may be a member having other than a cylindrical shape (for example, a prismatic member) insofar as the bearing housing 12 has the insertion hole 12a.

Figure 3A:
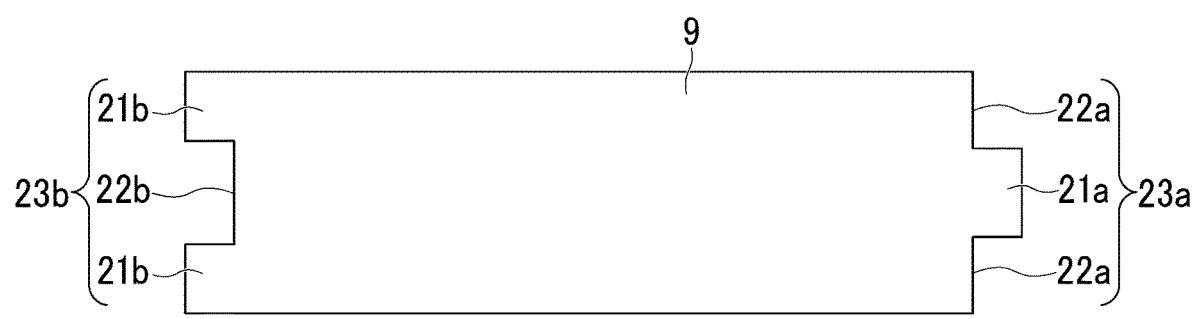
FIG. 3A is an unfolded plan view of a top foil according to the first embodiment of the present disclosure.
Figure 3B:
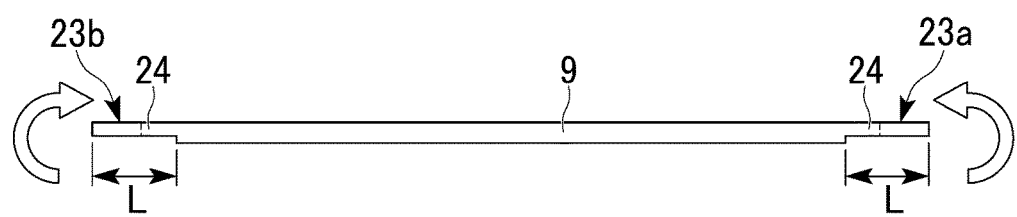
FIG. 3B is an unfolded front view of the top foil according to the first embodiment of the present disclosure.

FIG. 3A is an unfolded plan view of the top foil 9 according to the first embodiment of the present disclosure. FIG. 3B is an unfolded front view of the top foil 9.

As shown in FIG. 3A, the top foil 9 is a rectangular metal foil having a long side in the circumferential direction and a short side in the axial direction. As shown in FIG. 2, the top foil 9 is wound in a cylindrical shape and is disposed to face a peripheral surface of the rotary shaft 1.

As shown in FIG. 3A, a first uneven portion 23a is formed on a first short side (end portion, first end) of the top foil 9 in a long side direction, and the first uneven portion 23a has one protrusion 21a protruding to a first side in the long side direction and two recesses 22a formed on both sides of the protrusion 21a in a short side direction. That is, the first short side of the top foil 9 in the long side direction includes one protrusion 21a protruding to the first side in the long side direction and steps connected to both sides of the protrusion 21a in the short side direction.

In addition, a second uneven portion 23b is formed on a second short side (a short side (end portion, second end) positioned on a second side in the long side direction) which is opposite to the first short side of the top foil 9, and the second uneven portion 23b has two protrusions 21b spaced apart from each other in the short side direction and one recess 22b positioned between the two protrusions 21b. In other words, on the short side of the top foil 9 positioned on the second side in the long side direction, the recess 22b recessed to the first side in the long side direction and steps positioned on both sides of the recess 22b in the short side direction are provided.

The recess 22b of the second uneven portion 23b is formed to correspond to the protrusion 21a of the first uneven portion 23a. In addition, the recesses 22a of the first uneven portion 23a are formed to correspond to the protrusions 21b of the second uneven portion 23b. That is, the minimum interval of the recess 22b in the short side direction is larger than the maximum width of the protrusion 21a in the short side direction. In the present disclosure, the interval of the recess 22b in the long side direction and the length of the protrusion 21a in the long side direction are constant.

The recess 22b of the second uneven portion 23b is formed such that the protrusion 21a passes through the inside of the recess 22b when the top foil 9 is wound in a cylindrical shape such that the first uneven portion 23a and the second uneven portion 23b overlap each other. Similarly, the recesses 22a of the first uneven portion 23a are formed such that the protrusions 21b pass through the insides of the recesses 22a respectively when the top foil 9 is wound in a cylindrical shape. That is, the top foil 9 is formed such that a part (protrusion 21a) which extends from the first end (first short side) to a first side in the circumferential direction and a part (protrusions 21b) which extends from the second end (second short side) to a second side in the circumferential direction intersect each other in the axial direction.

The protrusions 21a and 21b (both ends of the top foil 9) that have passed through the recesses 22b and 22a respectively are extracted to the bearing housing 12 side, as shown in FIG. 2. That is, when the top foil 9 disposed on the inner peripheral side of the insertion hole 12a is viewed from the axial direction, the protrusion 21a and the protrusions 21b intersect each other. In addition, the protrusion 21a of the top foil 9 is positioned between the two protrusions 21b in the axial direction. A through-groove 13 into which the protrusions 21a and 21b are inserted is formed in the inner peripheral surface of the insertion hole 12a of the bearing housing 12. The through-groove 13 extends from one end surface 12b to the other end surface 12b of the bearing housing 12 in the axial direction.

As shown in FIG. 3B, in the top foil 9, thin wall portions 24 are formed on a side (side of the first short side) where the first uneven portion 23a is formed and on a side (side of the second short side) where the second uneven portion 23b is formed, and each thin wall portion 24 has a small thickness (is thin) compared to a middle portion between the thin wall portions 24. As shown in FIG. 2, an outer peripheral surface (surface on the bearing housing 12 side) of the thin wall portion 24 is recessed and thinner than an outer peripheral surface of the middle portion is.

As shown in FIG. 2, the length L of the thin wall portion 24 in the circumferential direction is set to a length corresponding to the through-groove 13 and one hill part 11c at an end portion of the back foil 11. In the present disclosure, steps are provided in the outer peripheral surface of the top foil 9 disposed in the bearing housing 12, and the top foil 9 becomes thin via the steps. In addition, each thin wall portion 24 extends from the respective end of the top foil 9 in the circumferential direction to a circumferential position beyond the hill part 11c which is closest to the end of the top foil 9.

The back foil 11 is disposed between the bearing housing 12 and the intermediate foil 10. The back foil 11 is a foil (thin plate) that elastically supports the intermediate foil 10 and the top foil 9. As the back foil 11, for example, a bump foil, spring foils described in Japanese Unexamined Patent Application, First Publication No. 2006-57652 and Japanese Unexamined Patent Application, First Publication No. 2004-270904, and a back foil described in Japanese Unexamined Patent Application, First Publication No. 2009-299748 may be used. In the present embodiment, a bump foil is used as the back foil 11.

The back foil 11 of the present disclosure is configured by three (a plurality of) back foil pieces 11a disposed along the inner peripheral surface of the insertion hole 12a. The back foil piece 11a is a foil (thin plate) that is in a corrugated plate shape in the circumferential direction. The three back foil pieces 11a are curved to have a substantially cylindrical shape as a whole when viewed from the axial direction. The back foil pieces 11a are disposed along the inner peripheral surface of the insertion hole 12a. In the present disclosure, all of the three back foil pieces 11a are formed in the same shape and dimension. Therefore, the back foil pieces 11a are disposed such that the back foil pieces 11a divide the inner peripheral surface of the insertion hole 12a into substantially three equal parts in the circumferential direction.

The back foil piece 11a is formed such that the hill parts 11c protruding radially inward and valley parts 11b protruding radially outward when viewed from the hill part 11c are alternately disposed in the circumferential direction. That is, the back foil piece 11a (back foil 11) has protrusions and recesses in the radial direction of the insertion hole 12a. Flat portions of the valley parts 11b facing the insertion hole 12a can be in contact with the bearing housing 12. In addition, the hill parts 11c can be in contact with the intermediate foil 10 (intermediate foil piece 10a). As described above, the hill parts 11c of the back foil pieces 11a elastically support the top foil 9 via the intermediate foil pieces 10a. Both ends of the back foil piece 11a in the circumferential direction are the valley parts 11b.

The intermediate foil 10 is disposed between the top foil 9 and the back foil 11. In the present disclosure, the intermediate foil 10 is configured by three intermediate foil pieces 10a disposed along the inner peripheral surface of the insertion hole 12a. The three intermediate foil pieces 10a each have a substantially rectangular shape when the intermediate foil pieces 10a are unfolded, and are curved in a substantially cylindrical shape as a whole when viewed from the axial direction, as shown in FIG. 2. In the present disclosure, all of the three intermediate foil pieces 10a are formed in the same shape and dimension. Therefore, the intermediate foil pieces 10a are disposed such that the intermediate foil pieces 10a divide the inner peripheral surface of the insertion hole 12a into substantially three equal parts in the circumferential direction.

The thickness of the intermediate foil piece 10a is smaller than the thickness of the back foil piece 11a. The outer shape of the intermediate foil piece 10a has substantially the same size as the outer shape of the back foil piece 11a. The intermediate foil piece 10a has a flat surface portion 10b that is in contact with top portions of the hill parts 11c of the back foil 11 and folded protruding portions 10c that are recessed (protruded) radially outward from the flat surface portion 10b. That is, the folded protruding portion 10c is spaced apart from the top foil 9. The folded protruding portion 10c is formed at a circumferential position (a middle position of the intermediate foil piece 10a in the circumferential direction in the present disclosure) between both ends of the intermediate foil piece 10a in the circumferential direction.

As shown in FIG. 2, a pair of fitting grooves 15 extending radially outward from an inner peripheral edge of the insertion hole 12a are formed in end surfaces 12b of the bearing housing 12 on both sides in the axial direction. In the present disclosure, the pair of fitting grooves 15 are formed at each of three positions where the end surface 12b of the bearing housing 12 is almost divided in three in the circumferential direction. The folded protruding portion 10c of the intermediate foil piece 10a is fitted to the fitting groove 15. In the drawing, a gap is provided between the fitting groove 15 and the folded protruding portion 10c. However, the gap is provided in order to clearly distinguish between both members, and the members are in contact with each other in the actual device (the same applies to the following drawings).

In the present disclosure, the through-groove 13 is disposed between two fitting grooves 15 among the three fitting grooves 15. In addition, the remaining one fitting groove 15 faces the through-groove 13 in the circumferential direction. In order to form the fitting grooves 15, cutting with an end mill may be selected as appropriate. In addition, the fitting grooves 15 may not be formed by penetrating from the inner peripheral edge to the outer peripheral edge of the bearing housing 12.

Figure 4:
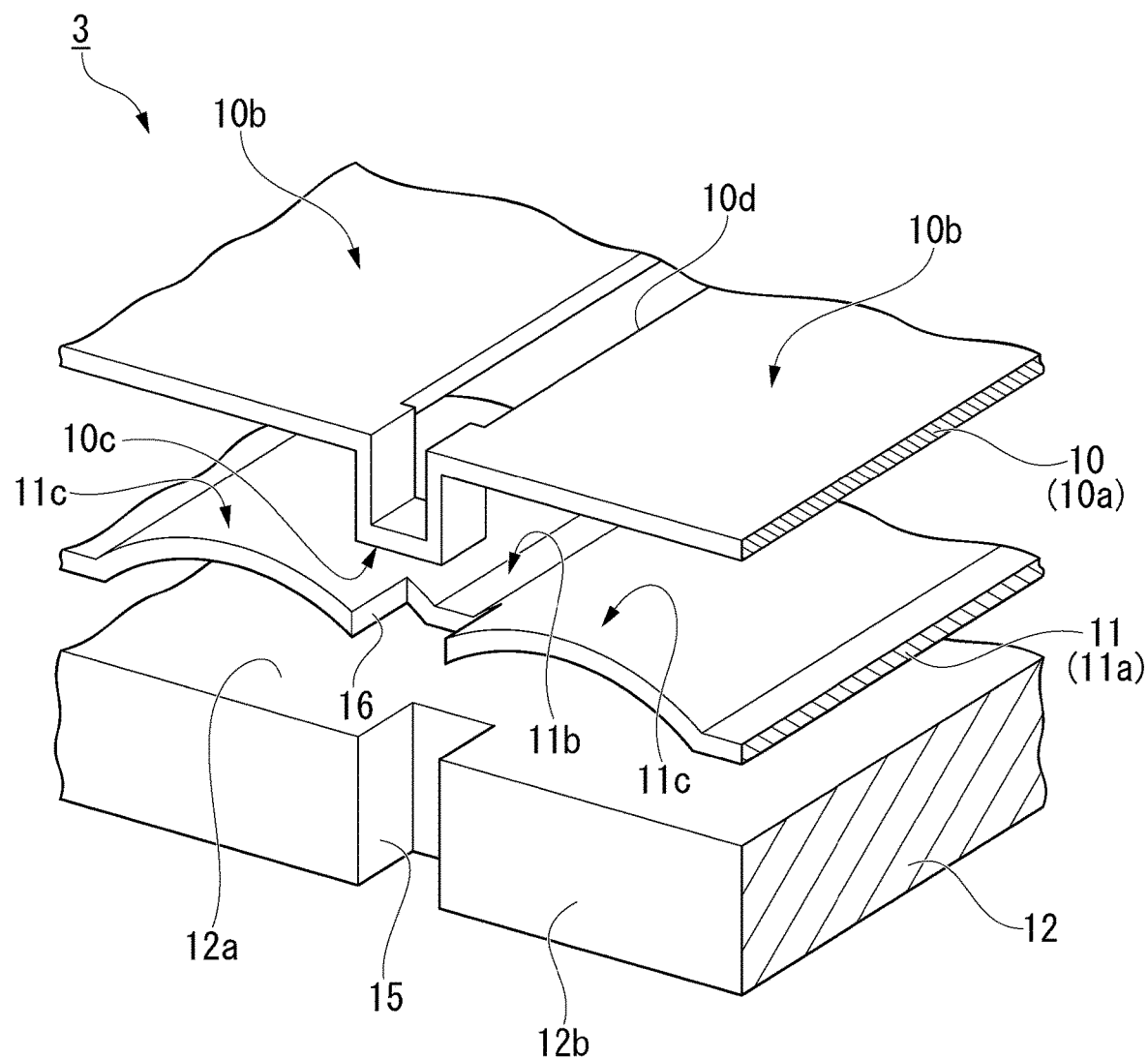
FIG. 4 is an enlarged perspective view of main portions of the radial foil bearing according to the first embodiment of the present disclosure.
Figure 5:
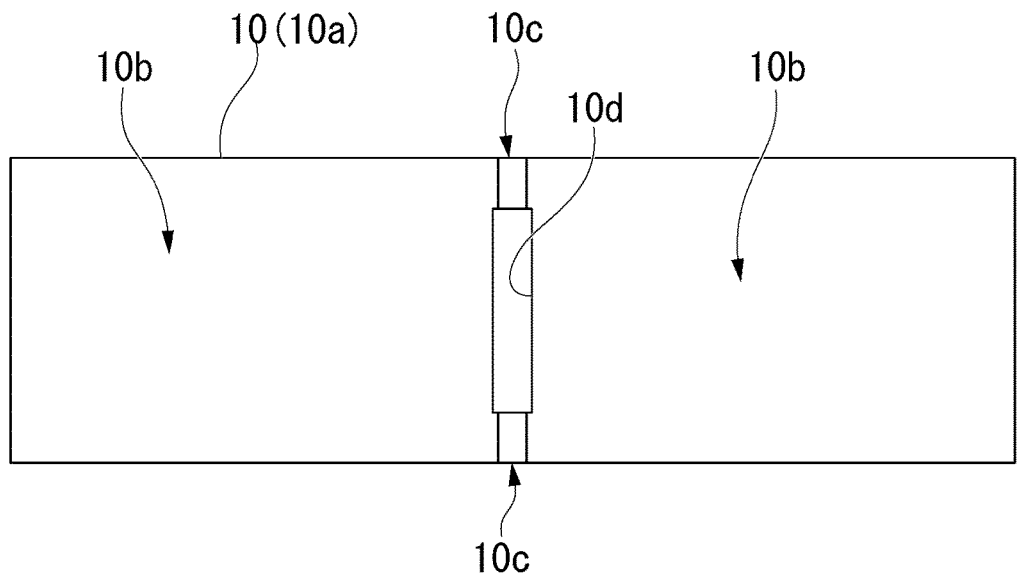
FIG. 5 is an unfolded plan view of an intermediate foil piece according to the first embodiment of the present disclosure.
Figure 6:
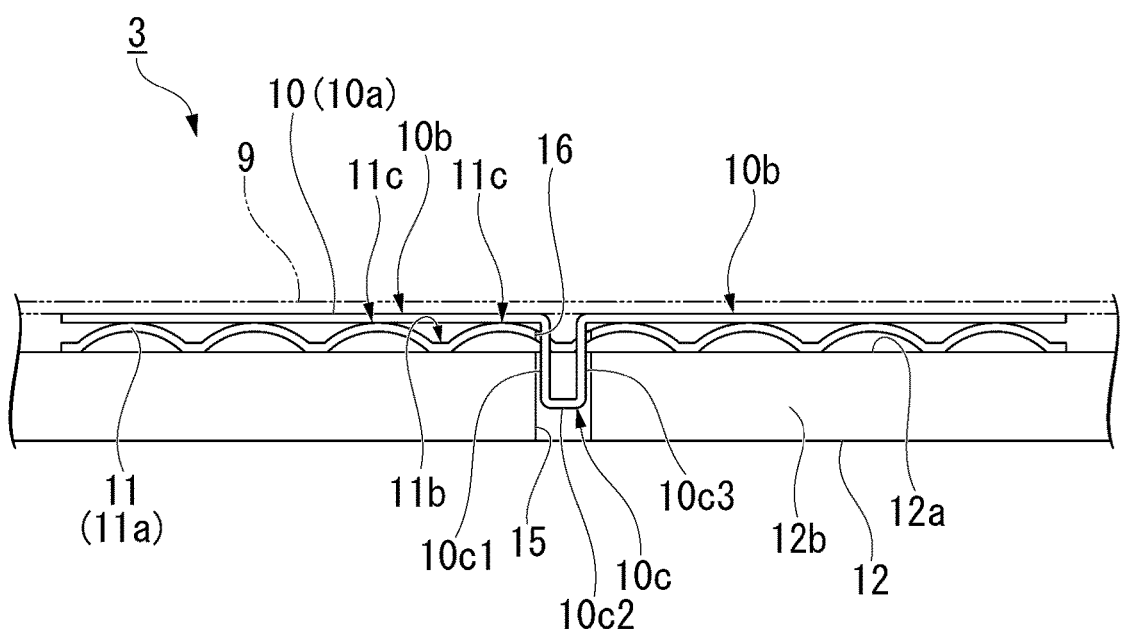
FIG. 6 is a front view viewed from an axial direction with the main portions of the radial foil bearing according to the first embodiment of the present disclosure flattened.
Figure 7:
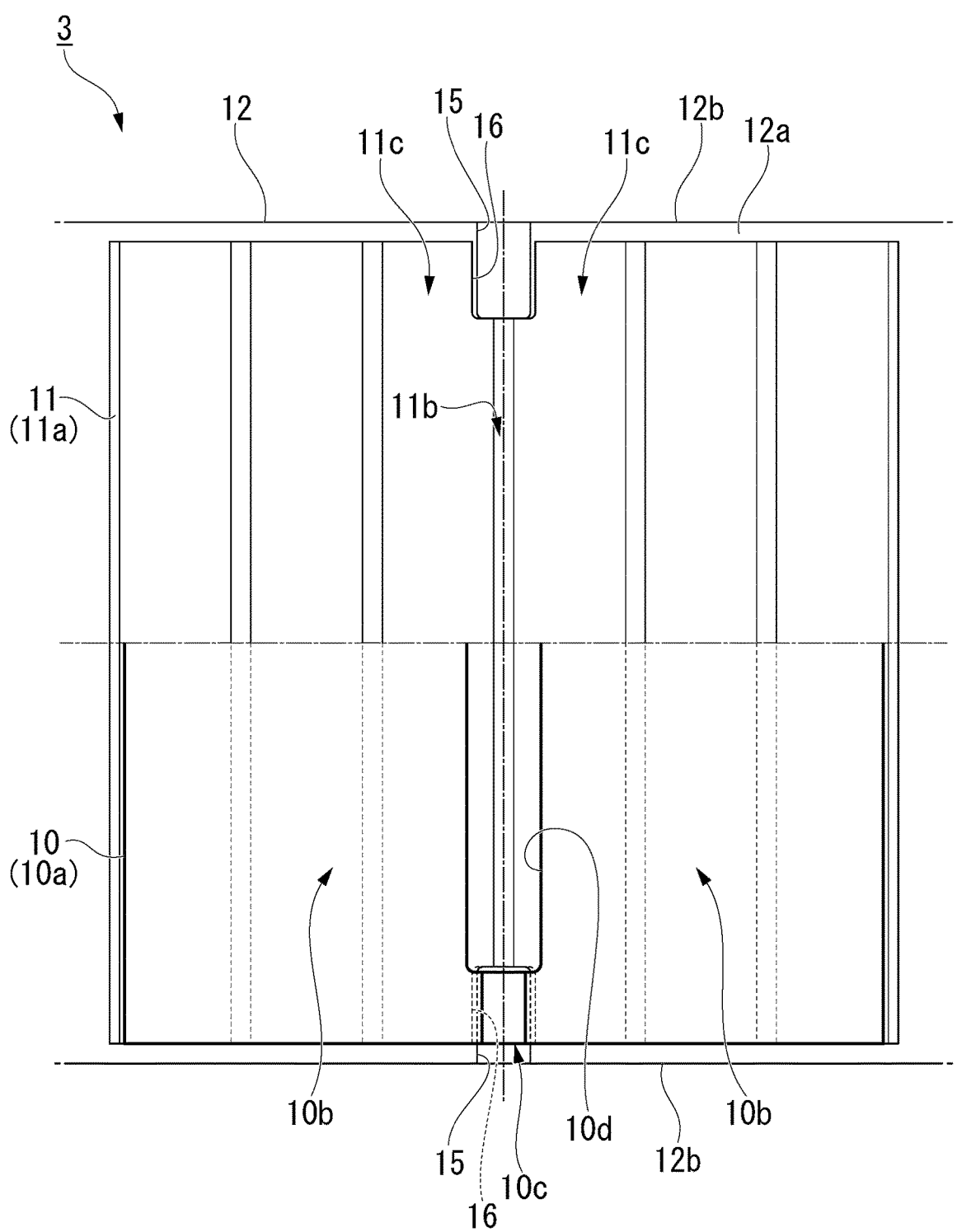
FIG. 7 is a plan view viewed from a radial direction with the main portions of the radial foil bearing according to the first embodiment of the present disclosure flattened.

FIG. 4 is an enlarged perspective view of main portions of the radial foil bearing 3 according to the first embodiment of the present disclosure. FIG. 5 is an unfolded plan view of the intermediate foil piece 10a according to the first embodiment of the present disclosure. FIG. 6 is a front view viewed from the axial direction with the main portions of the radial foil bearing 3 according to the first embodiment of the present disclosure flattened. FIG. 7 is a plan view viewed from the radial direction with the main portions of the radial foil bearing 3 according to the first embodiment of the present disclosure flattened. On the upper side of the page of FIG. 7, the intermediate foil piece 10a on the back foil piece 11a is not shown for the sake of the improvement of visibility.

As shown in the drawings, a notch 16 is formed in each of edge portions (both peripheral edge portions) of the back foil piece 11a on both sides in the axial direction. The notch 16 is provided at a circumferential position (a middle portion of the back foil piece 11a in a direction along the circumferential direction of the bearing housing 12) between both ends of the back foil piece 11a in the circumferential direction. That is, a recess in the axial direction is formed in the edge portion of the back foil piece 11a along the circumferential direction, at a circumferential position between both ends of the back foil piece 11a in the circumferential direction.

As shown in FIGS. 4 and 7, the notch 16 is formed in the valley part 11b of the back foil piece 11a. The notch 16 of the present disclosure is formed by notching a region including the valley part 11b and root portions (that is, portions of the hill parts 11c, which are adjacent to the valley part 11b) of the hill parts 11c and 11c, which are adjacent to each other with the valley part 11b sandwiched therebetween, toward a central portion in the axial direction of the bearing housing 12. That is, the notch 16 is formed in a circumferential area including the valley part 11b. The notch 16 is formed in the back foil piece 11a at a position corresponding to the fitting groove 15 of the bearing housing 12, that is, a position overlapping the fitting groove 15. In addition, the width of the notch 16 is formed to be the same as the width of the fitting groove 15.

As shown in FIG. 5, the folded protruding portion 10c is formed at each of edge portions (both peripheral edge portions) of the intermediate foil piece 10a on both sides in the axial direction. The folded protruding portion 10c is provided at a circumferential position (a middle portion of the intermediate foil piece 10a in the direction along the circumferential direction of the bearing housing 12) between both ends of the intermediate foil piece 10a in the circumferential direction. That is, the intermediate foil piece 10a has two folded protruding portions 10c at positions facing each other in the axial direction. In other words, the intermediate foil piece 10a has the folded protruding portions 10c at end edges on both sides in the axial direction. In addition, the intermediate foil piece 10a has a hole portion 10d between the two folded protruding portions 10c formed at the end edges on both sides in the axial direction. The hole portion 10d has a circumferential width which is equal to or larger than the circumferential width of the folded protruding portion 10c, and extends in the axial direction. In addition, the axial width of the hole portion 10d is larger than the axial width of the folded protruding portion 10c. That is, the intermediate foil piece 10a has the hole portion 10d (slit) extending in the axial direction and disposed at a circumferential position between both ends of the intermediate foil piece 10a in the circumferential direction. That is, two flat surface portions 10b of the intermediate foil piece 10a are separated by the hole portion 10d (slit), and are connected to each other by the two folded protruding portions 10c at both peripheral edge portions of the intermediate foil piece 10a.

As shown in FIGS. 6 and 7, the folded protruding portion 10c passes through the notch 16 of the back foil piece 11a in the radial direction, and is fitted to the fitting groove 15 of the bearing housing 12. That is, the folded protruding portion 10c is formed at a position corresponding to the notch 16 of the back foil piece 11a and the fitting groove 15 of the bearing housing 12, that is, a position overlapping the notch 16 and the fitting groove 15. As shown in FIG. 6, the folded protruding portion 10c is bent outward in the radial direction of the insertion hole 12a from a first flat surface portion 10b of the two flat surface portions 10b separated by the hole portion 10d, and is bent back inward in the radial direction toward a second flat surface portion 10b of the two flat surface portions 10b. Specifically, the folded protruding portion 10c is formed in a substantially U-shape having an extension portion (first bent portion) 10c1 that extends radially outward from the first flat surface portion 10b and a return portion (second bent portion) 10c3 that extends radially inward to the second flat surface portion 10b, and a connection portion 10c2 that connects the extension portion 10c1 and the return portion 10c3 to each other.

That is, the extension portion (first bent portion) 10c1 extends radially outward from the first flat surface portion 10b, the return portion (second bent portion) 10c3 extends radially outward from the second flat surface portion 10b, and the connection portion 10c2 connects radially outward end portions of the extension portion (first bent portion) 10c1 and the return portion (second bent portion) 10c3 to each other.

The extension portion 10c1, the connection portion 10c2, and the return portion 10c3 can be continuously traced in the circumferential direction in this order starting from the flat surface portion 10b. Although the connection portion 10c2 is provided in the present disclosure, for example, the extension portion 10c1 and the return portion 10c3 may be connected to each other in a substantially V-shape without providing the connection portion 10c2.

In the present disclosure, the extension portion 10c1 is bent radially outward at approximately 90° with respect to the flat surface portion 10b. In addition, the connection portion 10c2 is bent radially inward at approximately 90° with respect to the extension portion 10c1. In addition, the return portion 10c3 is bent radially inward at approximately 90° with respect to the connection portion 10c2, and is connected to the second flat surface portion 10b. The folded protruding portion 10c is in contact with the fitting groove 15 in an energy storing state. The folded protruding portion 10c of the present disclosure is formed by folding one leaf spring (elastic member) into a substantially U-shape. The folded protruding portion 10c is fitted to the fitting groove 15 in a state of being slightly contracted in the circumferential direction. Accordingly, a springback that the extension portion 10c1 and the return portion 10c3 tend to open in the circumferential direction acts on the folded protruding portion 10c. Accordingly, a frictional force is generated between the folded protruding portion 10c and the fitting groove 15, and the intermediate foil piece 10a is held by the bearing housing 12.

Next, the operation of the radial foil bearing 3 having the configuration described above will be described.

When the rotary shaft 1 is stopped, the top foil 9 is biased toward the rotary shaft 1 side by the back foil 11 (three back foil pieces 11a) via the intermediate foil 10 (three intermediate foil pieces 10a), and is brought into close contact with the rotary shaft 1. In the present embodiment, since both end portions of the top foil 9 are the thin wall portions 24, a force (local preload) for tightening the rotary shaft 1 is alleviated in the thin wall portions 24 compared to a case where there is no thin wall portion 24.

Then, when the rotary shaft 1 is started to move in an arrow P direction in FIG. 2, the rotary shaft starts to rotate at a low speed initially, and then gradually accelerates to rotate at a high speed. Then, as indicated by an arrow Q in FIG. 2, an ambient fluid is drawn in from one end side of each of the top foil 9, the intermediate foil 10, and the back foil 11, and flows into a space between the top foil 9 and the rotary shaft 1. Accordingly, a fluid lubrication film is formed between the top foil 9 and the rotary shaft 1.

A film pressure of the fluid lubrication film acts on the top foil 9, and the hill parts 11c of the back foil pieces 11a are pressed via the intermediate foil 10 which is in contact with the top foil 9. Then, as the back foil pieces 11a are pressed by the intermediate foil 10, the hill parts 11c are pressed and spread, and consequently, the back foil pieces 11a are about to move on the bearing housing 12 in the circumferential direction. That is, since the back foil pieces 11a (back foil 11) elastically support the top foil 9 via the intermediate foil 10, when the back foil piece 11a receives a load from the top foil 9, the back foil piece 11a deforms in the circumferential direction thereof to allow the top foil 9 and the intermediate foil 10 to bend, thereby supporting the top foil 9 and the intermediate foil 10.

Here, as shown in FIG. 6, the folded protruding portion 10c of the intermediate foil piece 10a is inserted in the notch 16 formed in the end edge of the back foil piece 11a in the axial direction. As the folded protruding portion 10c is fitted to the fitting groove 15 formed in the end surface 12b of the bearing housing 12 and the folded protruding portion 10c is inserted into the notch 16, the rotation of the back foil piece 11a in the circumferential direction is prevented. Therefore, the hill parts 11c of the back foil piece 11a deform (move) in the circumferential direction with the notch 16, in which the folded protruding portion 10c is inserted, sandwiched therebetween.

The two folded protruding portions 10c are provided at positions facing each other in the axial direction. The folded protruding portion 10c faces the bearing housing 12 in the axial direction, and also faces the back foil piece 11a in the axial direction. That is, the folded protruding portion 10c prevents the intermediate foil piece 10a from moving in the axial direction with respect to the bearing housing 12, and also prevents the back foil piece 11a from moving in the axial direction. Accordingly, the intermediate foil piece 10a and the back foil piece 11a are prevented from coming off the bearing housing 12.

In addition, as shown in FIGS. 5 and 7, the intermediate foil piece 10a has the hole portion 10d between the two folded protruding portions 10c. In a case where the hole portion 10d is not formed, a region of the intermediate foil piece 10a, which is located inside the two folded protruding portions 10c in the axial direction, also protrudes radially outward through bending like the folded protruding portion 10c, and there is a possibility that the region may interfere with the back foil piece 11a. The interference of the intermediate foil piece 10a with the back foil piece 11a can be avoided by providing the hole portion 10d between the two folded protruding portions 10c.

When a load is transmitted from the top foil 9 to the back foil pieces 11a, the intermediate foil pieces 10a bend together with the top foil 9 and the back foil pieces 11a. At this time, a "slip" occurs between the intermediate foil piece 10a and the top foil 9, the back foil piece 11a, and the bearing housing 12. That is, when pressure fluctuations occur in the fluid lubrication film due to shaft vibration of the rotary shaft 1, the pressure fluctuations are transmitted to the top foil 9 and the "slip" occurs. Since this "slip" causes energy dissipation attributable to friction and attenuates film pressure fluctuations, the shaft vibration of the rotary shaft 1 is prevented.

When a fluctuating load (repetition of loading and unloading) attributable to the shaft vibration of the rotary shaft 1 acts on the back foil piece 11a, and for example, the load is on an unloading side, the back foil piece 11a slightly rises from the inner peripheral surface of the insertion hole 12a of the bearing housing 12. At this time, the intermediate foil piece 10a is lifted together with the back foil piece 11a. Here, the folded protruding portion 10c of the intermediate foil piece 10a is in contact with the fitting groove 15 of the bearing housing 12. Therefore, a "slip" occurs between the folded protruding portion 10c and the fitting groove 15, causing energy dissipation attributable to friction and contributing as damping. The same applies when the load is on a loading side.

As described above, the radial foil bearing 3 includes the bearing housing 12 that has the insertion hole 12a therein, the top foil 9 that is disposed inside the insertion hole 12a, and the foil structure (the intermediate foil 10 and the back foil 11) that is interposed between the top foil 9 and the bearing housing 12. The intermediate foil 10 has the folded protruding portion 10c that is bent outward in the radial direction of the insertion hole 12a and is bent back inward in the radial direction. The folded protruding portion 10c is fitted to the fitting groove 15 formed in the end surface 12b of the bearing housing 12 in the axial direction in which the insertion hole 12a extends. By adopting this configuration, it is possible to improve a damping effect attributable to the foil friction.

Figure 8:
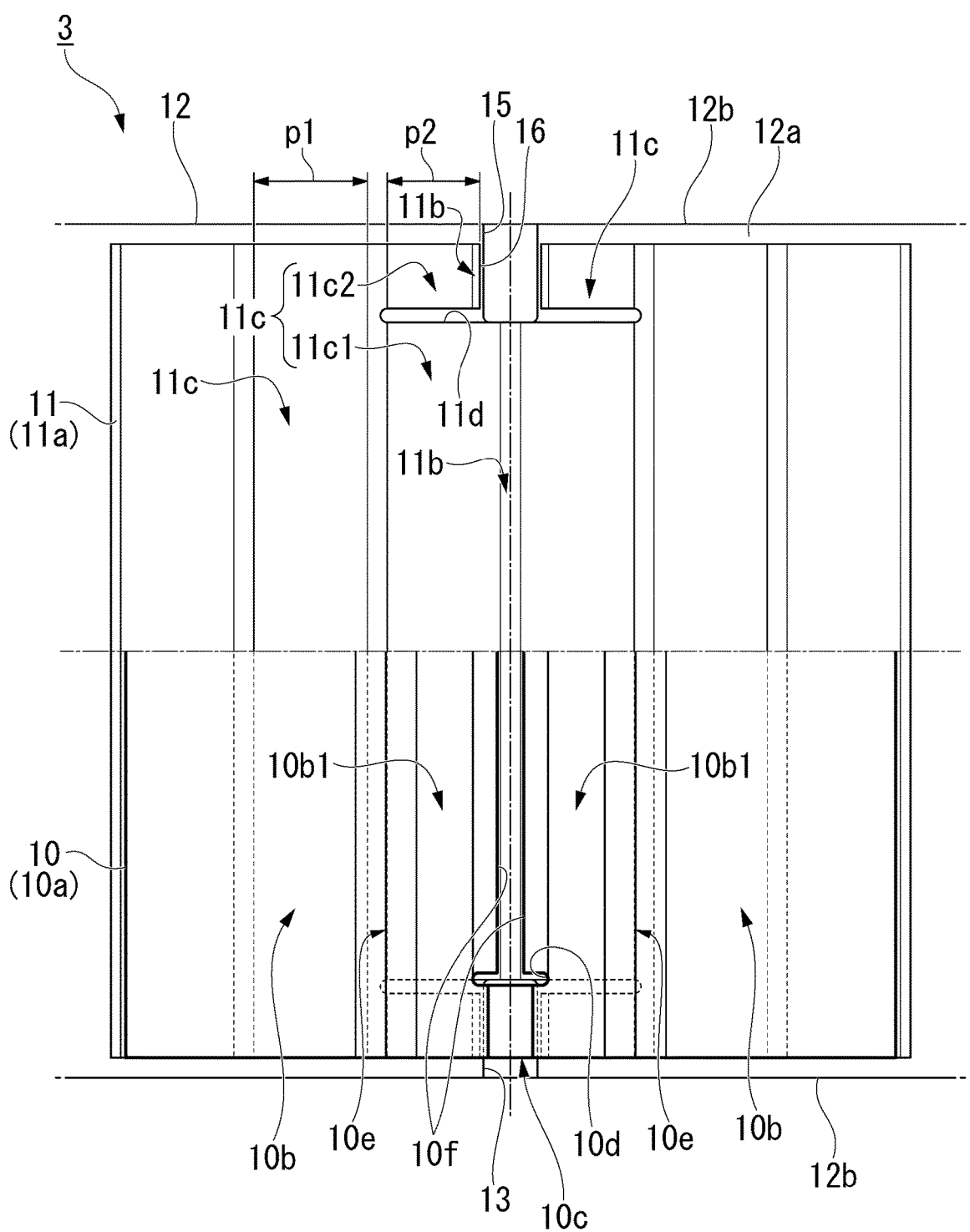
FIG. 8 is a plan view viewed from a radial direction with main portions of a radial foil bearing according to a first modification example of the first embodiment of the present disclosure flattened.
Figure 9:
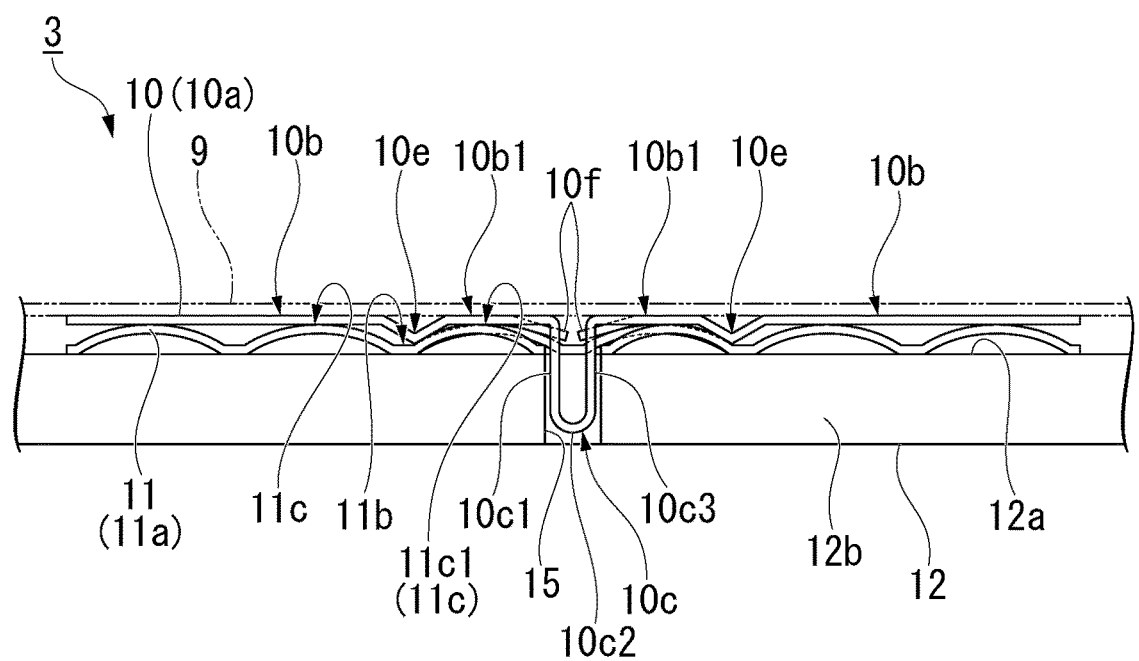
FIG. 9 is a front view viewed from an axial direction with the main portions of the radial foil bearing according to the first modification example of the first embodiment of the present disclosure flattened.

The radial foil bearing 3 of the first embodiment may adopt the configurations shown in FIGS. 8 and 9.

FIG. 8 is a plan view viewed from the radial direction with main portions of the radial foil bearing 3 according to a first modification example of the first embodiment of the present disclosure flattened. On the upper side of the page of FIG. 8, the intermediate foil piece 10a on the back foil piece 11a is not shown for the sake of the improvement of visibility. FIG. 9 is a front view viewed from the axial direction with the main portions of the radial foil bearing 3 according to the first modification example of the first embodiment of the present disclosure flattened.

In the back foil piece 11a of the radial foil bearing 3 shown in FIG. 8, each of the hill parts 11c and 11c, which are adjacent to each other with the notch 16 sandwiched therebetween, is separated into a first hill part 11c1 and a second hill part 11c2 by a slit 11d extending in the circumferential direction. Accordingly, it is possible for the first hill part 11c1 and the second hill part 11c2, between which the slit 11d is sandwiched in the axial direction and which face each other in the axial direction, to deform independently of each other. The slit 11d shown in FIG. 8 extends to the valley part 11b adjacent to the first hill part 11c1.

The slit 11d extends, from the end portion of the notch 16 extending toward the middle portion of the back foil piece 11a in the axial direction, to both sides in the circumferential direction. That is, a T-shaped recess in the axial direction is formed in the edge portion of the back foil piece 11a along the circumferential direction, at a circumferential position between both ends of the back foil piece 11a in the circumferential direction. The first hill part 11c1 is positioned inside the slit 11d in the axial direction, and the second hill part 11c2 is positioned outside the slit 11d in the axial direction. The pitch width p1 of the first hill part 11c1 is the same as the pitch of the other hill part 11c. On the other hand, the pitch width p2 of the second hill part 11c2 is smaller than the pitch width of the first hill part 11c1. Accordingly, the end portion of the second hill part 11c2 on the notch 16 side in the circumferential direction is served as the valley part 11b and is in contact with the insertion hole 12a of the bearing housing 12. In this manner, unlike the configuration shown in FIG. 7 described above, the notch 16 of the present modification example is not formed by notching the root portions of the hill parts 11c and 11c, which are adjacent to each other with the notch 16 sandwiched therebetween.

In addition, in the intermediate foil piece 10a of the radial foil bearing 3 shown in FIG. 8, a groove portion 10e protruding radially outward toward the back foil piece 11a may be formed in the flat surface portion 10b. As shown in FIG. 9, the groove portion 10e is formed in a substantially V-shape when viewed from the axial direction. The groove portion 10e is disposed at a circumferential position between a top portion of any one of the hill parts 11c and a top portion of the hill part 11c adjacent to this hill part 11c, in the corrugated plate shape of the back foil piece 11a. A second flat surface portion 10b1 separated in the circumferential direction by the groove portion 10e is formed in the flat surface portion 10b.

Further, the intermediate foil piece 10a may have an overhanging piece 10f that overhangs to the back foil piece 11a side (radially outward) from an opening end of the hole portion 10d in the circumferential direction toward a middle portion of the hole portion 10d in the circumferential direction. The overhanging piece 10f and the groove portion 10e are disposed with one hill part 11c sandwiched therebetween in the circumferential direction. The overhanging piece 10f and the groove portion 10e are obliquely formed to come into contact with a place (i.e., a side surface of the hill part 11c) of the hill part 11c other than the top portion of the hill part 11c. That is, the side surface of the hill part 11c is a curved surface, and the contact surfaces of the overhanging piece 10f and the groove portion 10e that come into contact with the side surface of the hill part 11c are inclined surfaces (flat surfaces). Therefore, the side surface of the hill part 11c comes into contact with the overhanging piece 10f at one point and is separated from the overhanging piece 10f at other places, and the side surface of the hill part 11c comes into contact with the groove portion 10e at one point and is separated from the groove portion 10e at other places. Accordingly, energy dissipation attributable to friction at the contact points between the side surface of the hill part 11c and the overhanging piece 10f and between the side surface of the hill part 11c and the groove portion 10e is likely to occur.

With the configuration, on the intermediate foil piece 10a, in addition to a first contact point where the flat surface portion 10b and the second flat surface portion 10b1 come into contact with the top portion of the hill part 11c of the back foil piece 11a, a second contact point where the overhanging piece 10f and the groove portion 10e come into contact with a place of the hill part 11c other than the top portion of the hill part 11c of the back foil piece 11a is formed. For this reason, a contact area between the intermediate foil piece 10a and the back foil piece 11a can be increased, a damping effect attributable to friction between the intermediate foil piece 10a and the back foil piece 11a can be increased, and the stability when the rotary shaft 1 rotating at a high speed is supported can be further increased.

Figure 10:
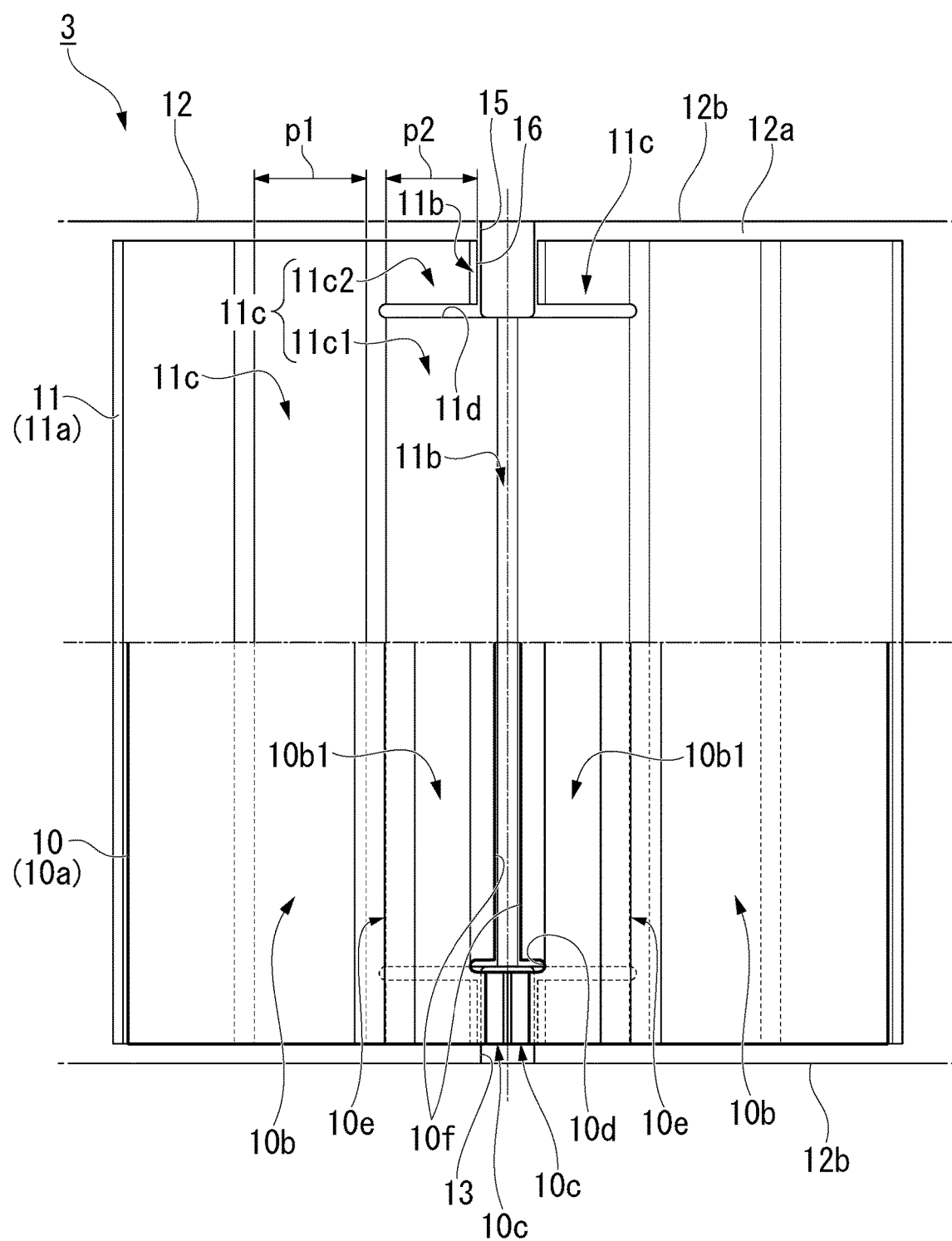
FIG. 10 is a plan view viewed from a radial direction with main portions of a radial foil bearing according to a second modification example of the first embodiment of the present disclosure flattened.
Figure 11:
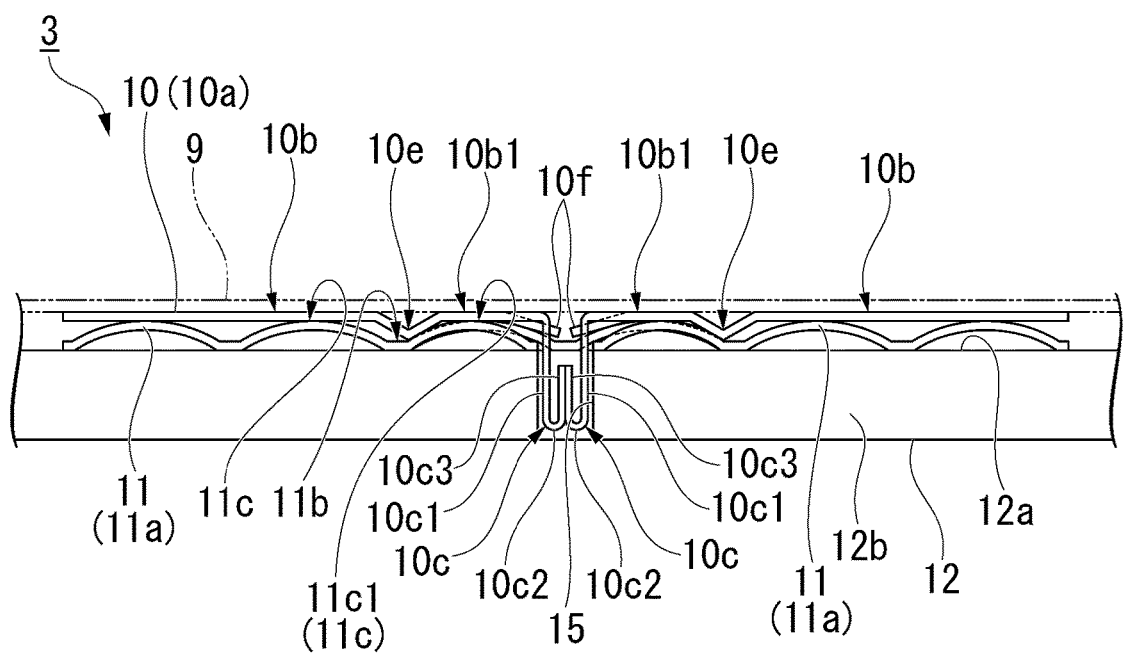
FIG. 11 is a front view viewed from an axial direction with the main portions of the radial foil bearing according to the second modification example of the first embodiment of the present disclosure flattened.

In addition, the radial foil bearing 3 of the first embodiment may further adopt the configurations shown in FIGS. 10 and 11.

FIG. 10 is a plan view viewed from the radial direction with main portions of the radial foil bearing 3 according to a second modification example of the first embodiment of the present disclosure flattened. On the upper side of the page of FIG. 10, the intermediate foil piece 10a on the back foil piece 11a is not shown for the sake of the improvement of visibility. FIG. 11 is a front view viewed from the axial direction with the main portions of the radial foil bearing 3 according to the second modification example of the first embodiment of the present disclosure flattened.

The intermediate foil piece 10a of the radial foil bearing 3 shown in FIGS. 10 and 11 has a structure where the intermediate foil piece 10a shown in FIGS. 8 and 9 is separated into two at the middle portion in the circumferential direction. The folded protruding portion 10c is provided at each of the intermediate foil pieces 10a which are separated from and adjacent to each other in the circumferential direction, and the folded protruding portions 10c, which are adjacent to each other in the circumferential direction, are disposed in one fitting groove 15 in a state where the folded protruding portions 10c face each other (see FIG. 11).

Specifically, each of the folded protruding portions 10c of the intermediate foil pieces 10a, which are adjacent to each other in the circumferential direction, has the extension portion 10c1, the connection portion 10c2, and the return portion 10c3. In the present modification example, the return portion 10c3 is not connected to the flat surface portion 10b, and forms an end portion of the intermediate foil piece 10a in the circumferential direction. The return portions 10c3 of the intermediate foil pieces 10a, which are adjacent to each other in the circumferential direction, are in contact with each other in the circumferential direction. In other words, the intermediate foil piece 10a shown in FIGS. 10 and 11 is configured by two separated parts which are arranged in the circumferential direction and between which the fitting groove 15 is sandwiched. In addition, each of the two separated parts has the flat surface portion 10b and the folded protruding portion 10c extending from the flat surface portion 10b. The folded protruding portions 10c of the two separated parts are inserted into the fitting groove 15. The folded protruding portions 10c press each other in the fitting groove 15. With the configuration, a "slip" occurs at a contact portion (the return portion 10c3) between the folded protruding portions 10c of the intermediate foil pieces 10a, which are adjacent to each other in the circumferential direction. Therefore, a damping effect attributable to friction increases, and the stability when the rotary shaft 1 rotating at a high speed is supported can be further increased.

Second Embodiment

Next, a second embodiment of the present invention will be described. In the following description, configurations which are the same or equivalent to the embodiment described above will be assigned with the same reference signs, and a description thereof will be simplified or omitted.

Figure 12:
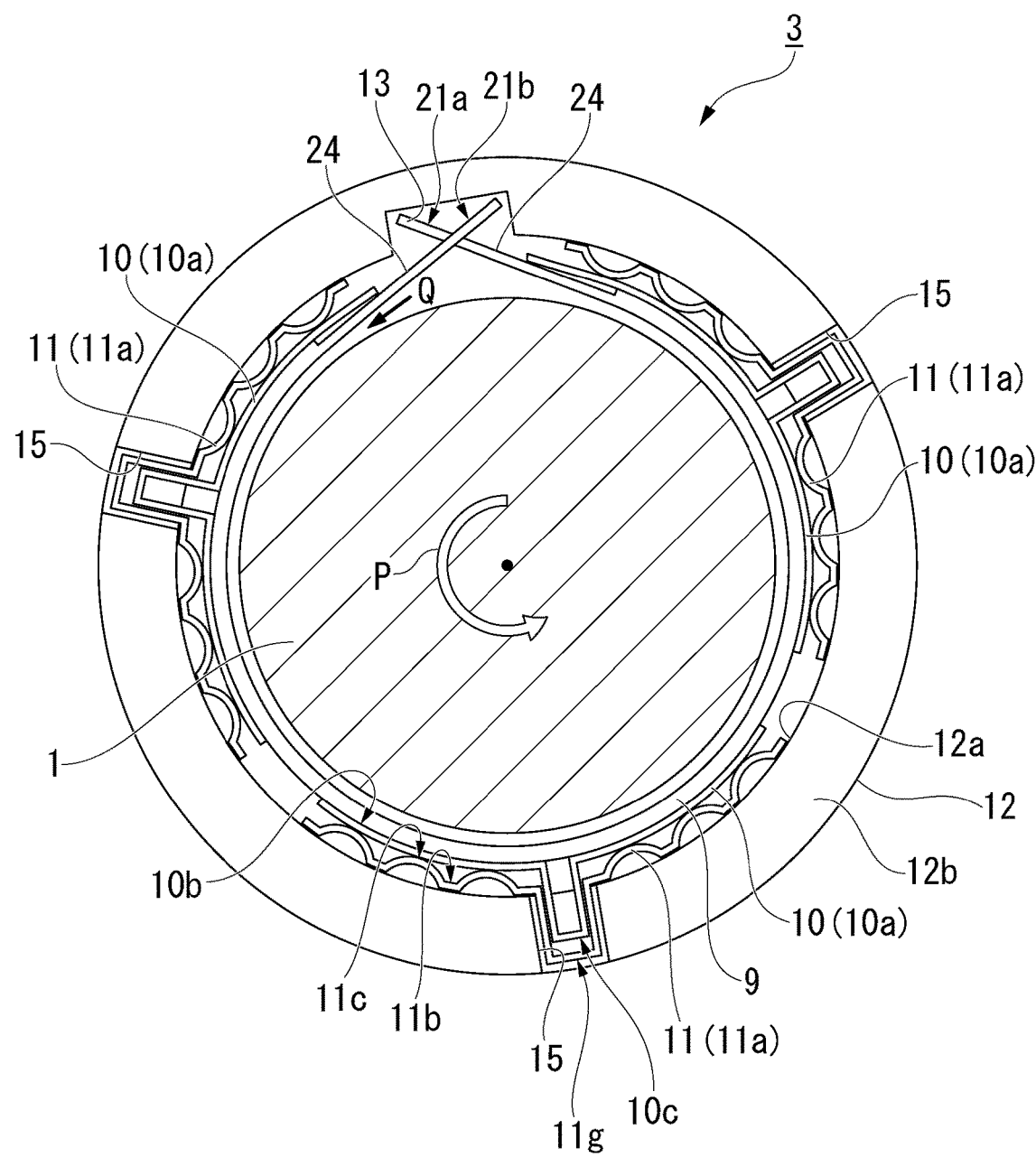
FIG. 12 is a front view showing a radial foil bearing according to a second embodiment of the present disclosure.
Figure 13:
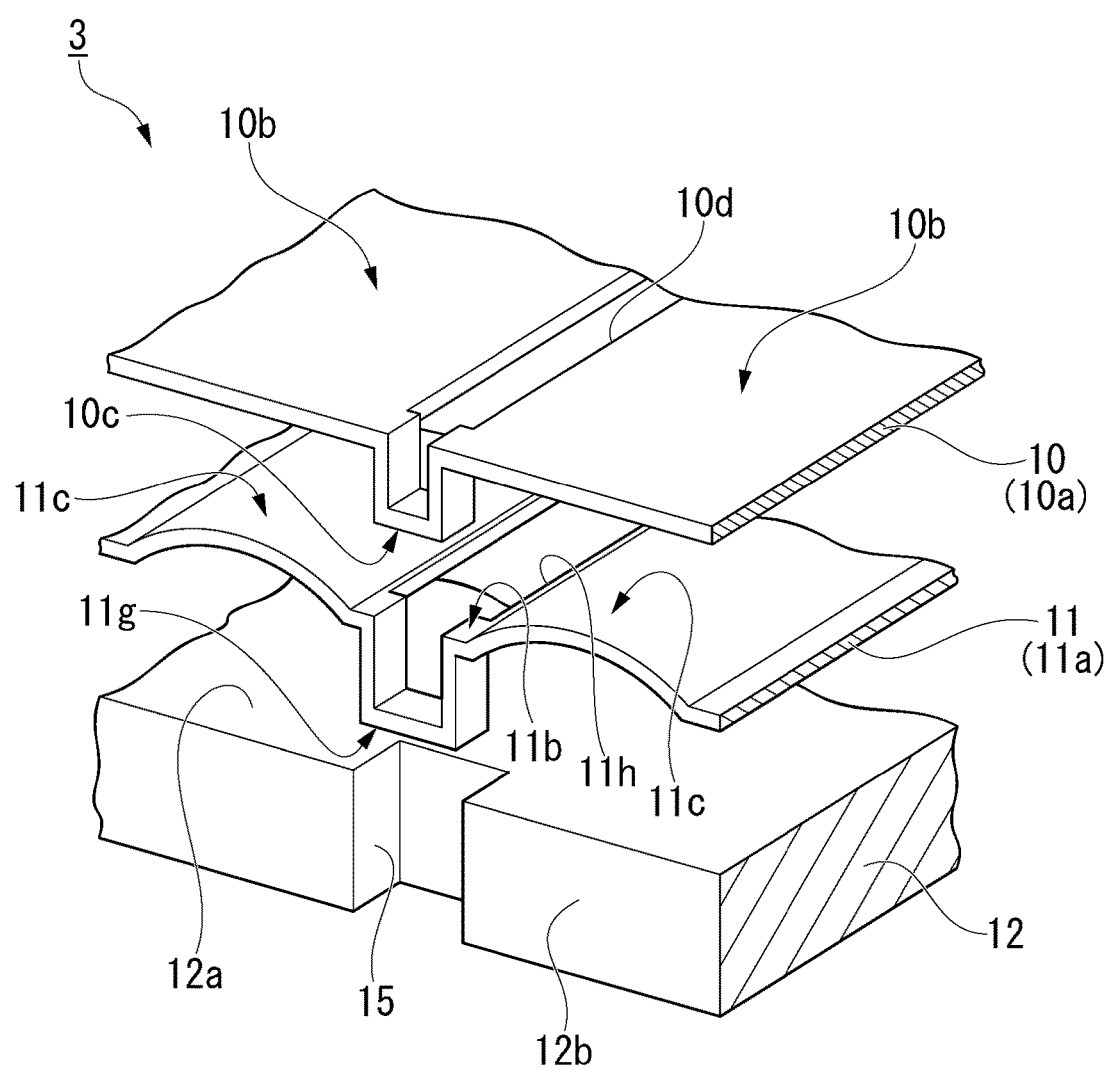
FIG. 13 is an enlarged perspective view of main portions of the radial foil bearing according to the second embodiment of the present disclosure.
Figure 14:
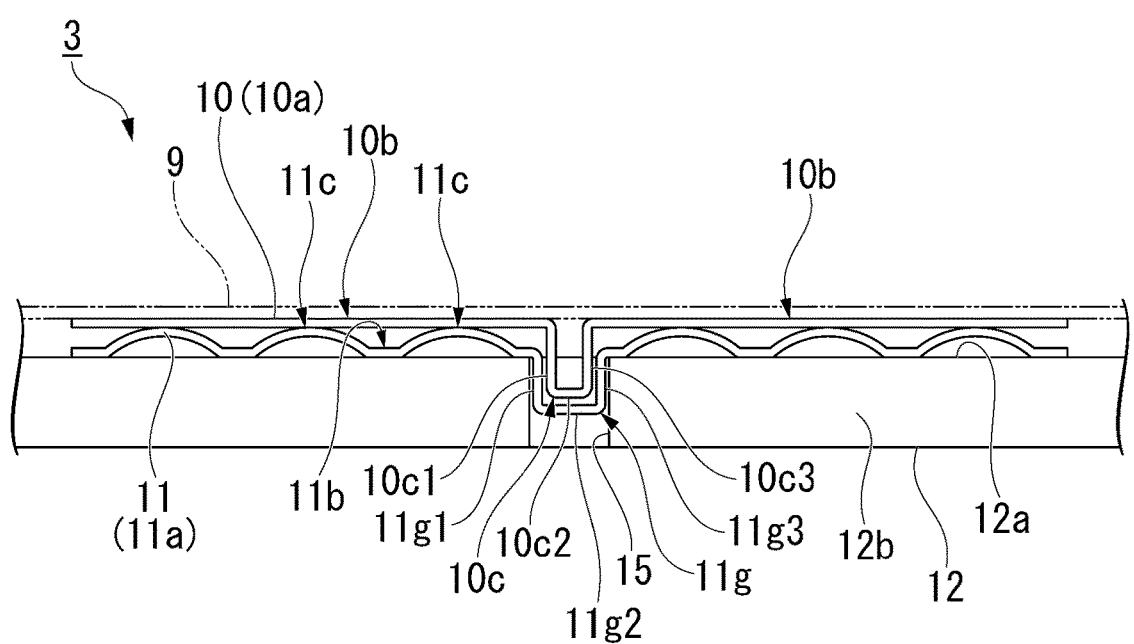
FIG. 14 is a front view viewed from an axial direction with the main portions of the radial foil bearing according to the second embodiment of the present disclosure flattened.
Figure 15:
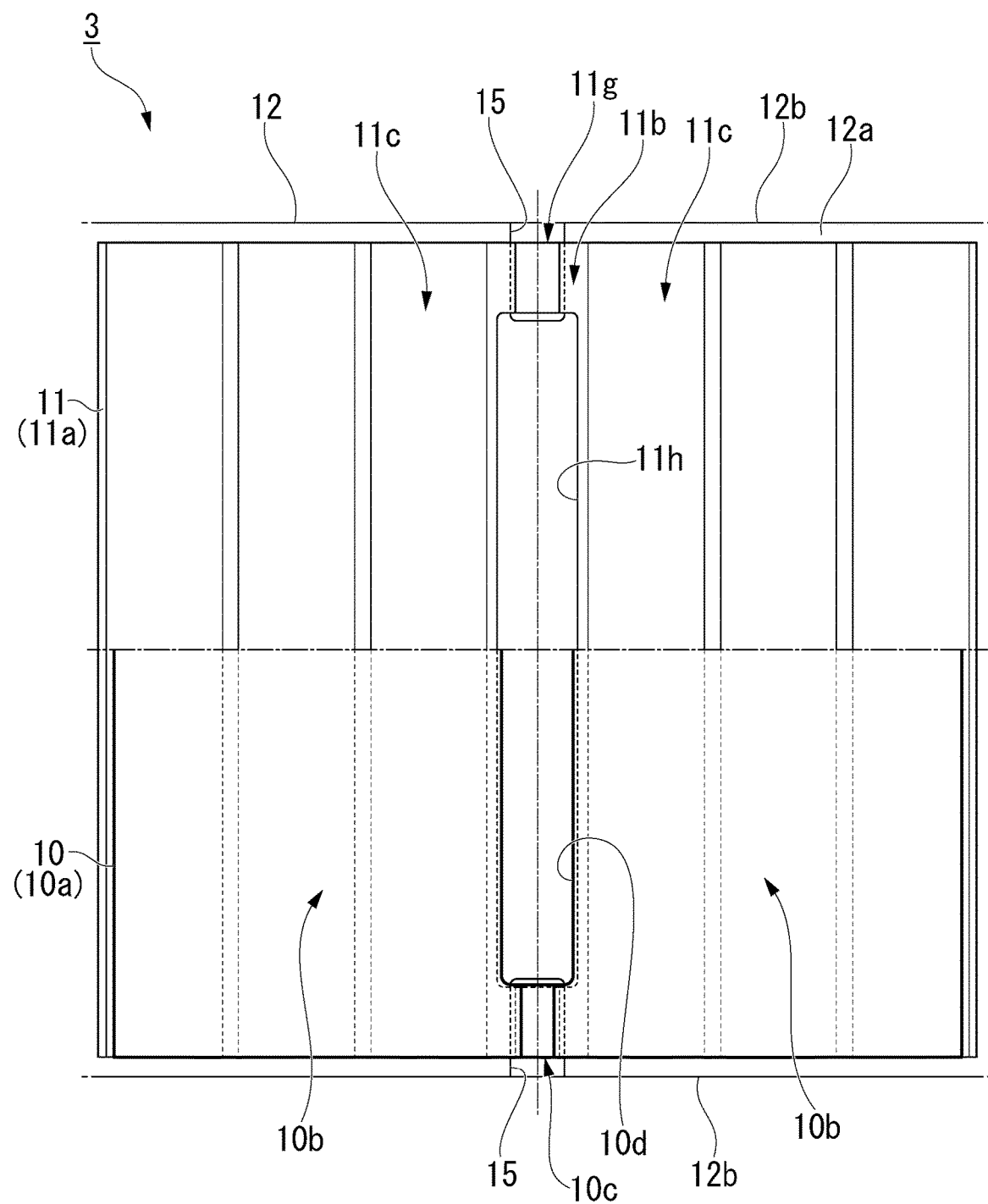
FIG. 15 is a plan view viewed from a radial direction with the main portions of the radial foil bearing according to the second embodiment of the present disclosure flattened.

FIG. 12 is a front view showing the radial foil bearing 3 according to the second embodiment of the present disclosure. FIG. 13 is an enlarged perspective view of main portions of the radial foil bearing 3 according to the second embodiment of the present disclosure. FIG. 14 is a front view viewed from the axial direction with the main portions of the radial foil bearing 3 according to the second embodiment of the present disclosure flattened. FIG. 15 is a plan view viewed from the radial direction with the main portions of the radial foil bearing 3 according to the second embodiment of the present disclosure flattened. On the upper side of the page of FIG. 15, the intermediate foil piece 10a on the back foil piece 11a is not shown for the sake of the improvement of visibility.

As shown in the drawings, the radial foil bearing 3 of the second embodiment is different from the first embodiment in that a folded protruding portion 11g is formed in the back foil piece 11a.

The folded protruding portion 11g of the back foil piece 11a is recessed (protruded) radially outward from the valley part 11b. The folded protruding portion 11g is formed at a circumferential position (a middle position of the back foil piece 11a in the circumferential direction in the present disclosure) between both ends of the back foil piece 11a in the circumferential direction. The folded protruding portion 11g of the back foil piece 11a is fitted to the fitting groove 15 of the bearing housing 12. In the drawing, a gap is provided between the fitting groove 15 and the folded protruding portion 11g. However, the gap is provided in order to clearly distinguish between both members, and both members are in contact with each other in the actual device.

The back foil piece 11a has two folded protruding portions 11g at positions facing each other in the axial direction. In addition, the back foil piece 11a has a hole portion 11h (see FIGS. 13 and 15) between the two folded protruding portions 11g. The hole portion 11h has a circumferential width which is equal to or larger than the circumferential width of the folded protruding portion 11g, and extends in the axial direction. That is, the back foil piece 11a has the hole portion 11h (slit) extending in the axial direction and disposed at a circumferential position between both ends of the back foil piece 11a in the circumferential direction. That is, the back foil piece 11a is separated by the hole portion 11h (slit), and the two separated back foil pieces 11a are connected to each other by the two folded protruding portions 11g at both peripheral edge portions of the back foil piece 11a. End portions (that is, end portions adjacent to each other with the hole portion 11h sandwiched therebetween) of the two back foil pieces 11a, which is separated by the hole portion 11h, on the hole portion 11h side are the valley parts 11b.

As shown in FIG. 14, the folded protruding portion 11g is fitted to the fitting groove 15 of the bearing housing 12. That is, the folded protruding portion 11g is formed at a position corresponding to the fitting groove 15 of the bearing housing 12, that is, a position overlapping the fitting groove 15. As shown in FIG. 13, the folded protruding portion 11g is bent radially outward from a first valley part 11b of the two valley parts 11b adjacent to each other with the hole portion 11h sandwiched therebetween, and is bent back radially inward to a second valley part 11b of the two valley parts 11b. Specifically, as shown in FIG. 14, the folded protruding portion 11g is formed in a substantially U-shape having an extension portion (first bent portion) 11g1 that extends radially outward from the first valley part 11b, a return portion (second bent portion) 11g3 that extends radially inward to the second valley part 11b separated by the folded protruding portion 11g, and a connection portion 11g2 that connects the extension portion 11g1 and the return portion 11g3 to each other.

That is, the extension portion (first bent portion) 11g1 extends radially outward from the first valley part 11b, the return portion (second bent portion) 11g3 extends radially outward from the second valley part 11b, and the connection portion 11g2 connects radially outward end portions of the extension portion (first bent portion) 11g1 and the return portion (second bent portion) 11g3 to each other.

In the present disclosure, the extension portion 11g1 is bent radially outward at approximately 90° with respect to the valley part 11b. In addition, the connection portion 11g2 is bent radially inward at approximately 90° with respect to the extension portion 11g1. In addition, the return portion 11g3 is bent radially inward at approximately 90° with respect to the connection portion 11g2, and is connected to the second valley part 11b. The folded protruding portion 11g is in contact with the fitting groove 15 in an energy storing state. The folded protruding portion 11g of the present disclosure is formed by folding one leaf spring (elastic member) into a substantially U-shape. The folded protruding portion 11g is fitted to the fitting groove 15 in a state of being slightly contracted in the circumferential direction. Accordingly, a springback that the extension portion 11g1 and the return portion 11g3 tend to open in the circumferential direction acts on the folded protruding portion 11g. Accordingly, a frictional force is generated between the folded protruding portion 11g and the fitting groove 15, and the back foil piece 11a is held by the bearing housing 12.

The folded protruding portion 10c (second folded protruding portion) formed at the intermediate foil piece 10a is fitted to a space (a space between the extension portion 11g1 and the return portion 11g3) inside the folded protruding portion 11g of the back foil 11. That is, the folded protruding portion 10c is formed at a position corresponding to the folded protruding portion 11g of the back foil piece 11a and the fitting groove 15 of the bearing housing 12, that is, a position overlapping the folded protruding portion 11g and the fitting groove 15. In the drawing, a gap is provided between the folded protruding portion 10c and the folded protruding portion 11g. However, the gap is provided in order to clearly distinguish between both members, and both members are in contact with each other in the actual device.

The folded protruding portion 10c is in contact with the inside (the extension portion 11g1 and the return portion 11g3) of the folded protruding portion 11g in an energy storing state. The folded protruding portion 10c is fitted to the inside of the folded protruding portion 11g in a state of being slightly contracted in the circumferential direction. Accordingly, a springback that the extension portion 10c1 and the return portion 10c3 tend to open in the circumferential direction acts on the folded protruding portion 10c. Accordingly, a frictional force is generated between the folded protruding portion 10c and the folded protruding portion 11g, and the intermediate foil piece 10a is held by the back foil piece 11a.

In the second embodiment having the configuration, in addition to an operational effect of the first embodiment described above, when the top foil 9 receives a fluctuating load attributable to the shaft vibration of the rotary shaft 1 and the intermediate foil piece 10a and the back foil piece 11a bend together, a "slip" occurs not only between the folded protruding portion 11g and the fitting groove 15 but also between the folded protruding portion 11g and the folded protruding portion 10c, causing energy dissipation attributable to friction and contributing as damping.

In the radial foil bearing 3 of the second embodiment, the contact area between the intermediate foil piece 10a and the back foil piece 11a can be increased, and a damping effect attributable to friction between the intermediate foil piece 10a and the back foil piece 11a can be further increased.

In addition, as shown in FIGS. 13 and 15, the back foil piece 11a has the hole portion 11h between the two folded protruding portions 11g. In a case where the hole portion 11h is not formed, a region of the back foil piece 11a, which is located inside the two folded protruding portions 11g in the axial direction, also protrudes radially outward through bending like the folded protruding portion 11g, and there is a possibility that the region may interfere with the bearing housing 12. The interference of the back foil piece 11a with the bearing housing 12 can be avoided by providing the hole portion 11h between the two folded protruding portions 11g.

Figure 16:
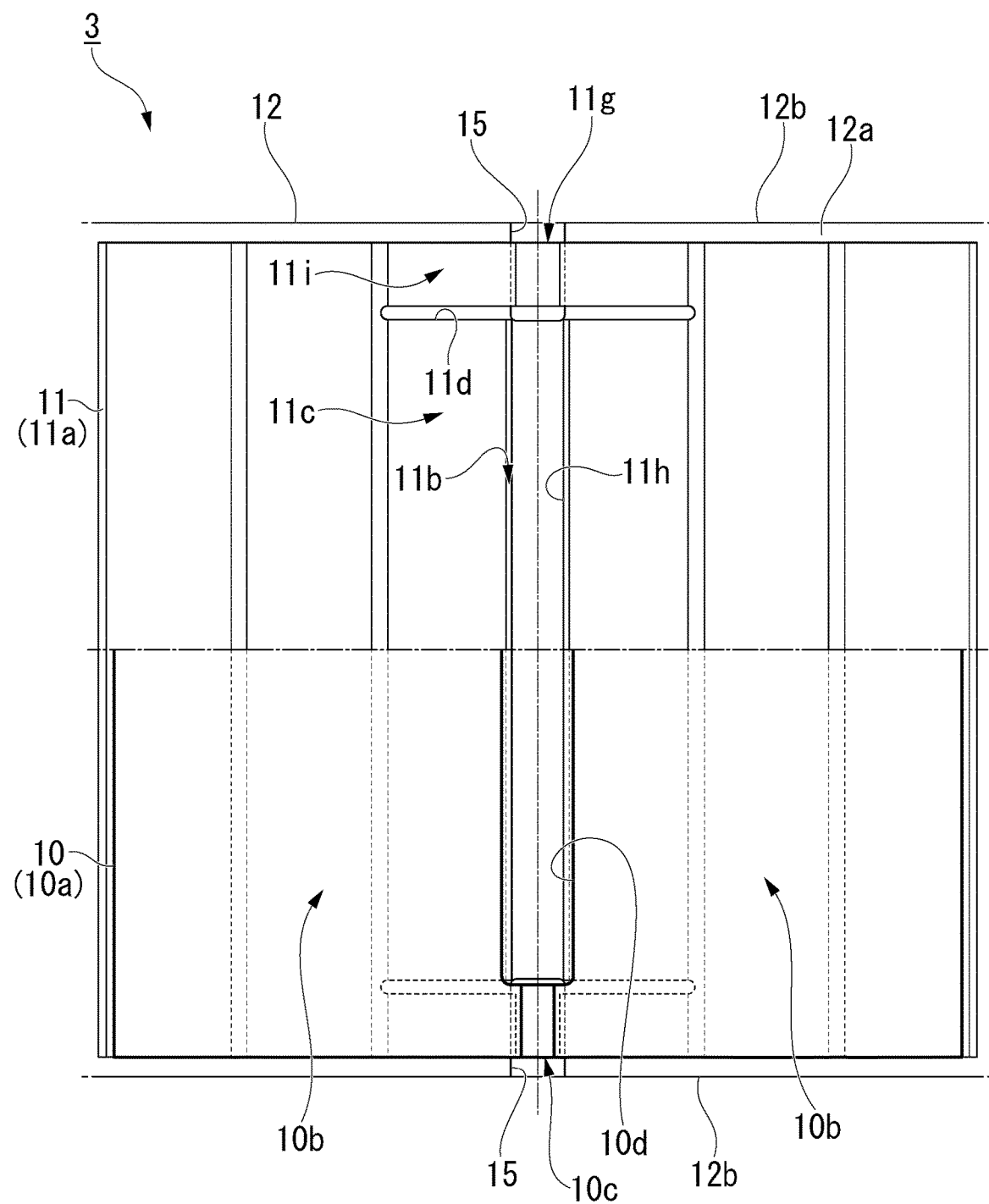
FIG. 16 is a plan view viewed from a radial direction with main portions of a radial foil bearing according to a first modification example of the second embodiment of the present disclosure flattened.
Figure 17:
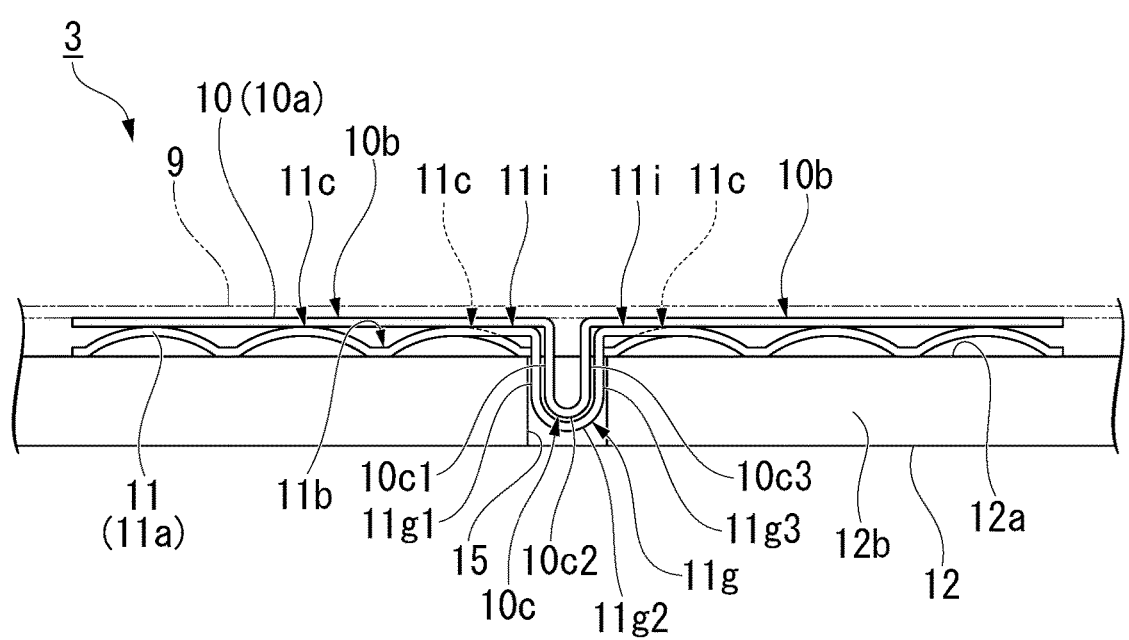
FIG. 17 is a front view viewed from an axial direction with the main portions of the radial foil bearing according to the first modification example of the second embodiment of the present disclosure flattened.

The radial foil bearing 3 of the second embodiment may adopt the configurations shown in FIGS. 16 and 17.

FIG. 16 is a plan view viewed from the radial direction with main portions of the radial foil bearing 3 according to a first modification example of the second embodiment of the present disclosure flattened. On the upper side of the page of FIG. 16, the intermediate foil piece 10a on the back foil piece 11a is not shown for the sake of the improvement of visibility. FIG. 17 is a front view viewed from the axial direction with the main portions of the radial foil bearing 3 according to the first modification example of the second embodiment of the present disclosure flattened.

In the back foil piece 11a of the radial foil bearing 3 shown in FIG. 16, the slit 11d extending in the circumferential direction is formed in the hill parts 11c and 11c, which are adjacent to each other with the notch 16 sandwiched therebetween, and a flat portion 11i is formed in a portion of the back foil piece 11a located outside the slit 11d in the axial direction.

The slit 11d extends, from both end portions of the hole portion 11h of the back foil piece 11a in the axial direction, to both sides in the circumferential direction. That is, an H-shaped hole portion in the axial direction is provided at a circumferential position between both ends of the back foil piece 11a in the circumferential direction. The flat portion 11i is positioned outside the slit 11d in the axial direction. In addition, as shown in FIG. 17, the flat portion 11i extends in the circumferential direction and is provided at the same radial position as the top portion of the hill part 11c. That is, the flat portion 11i of the back foil piece 11a is in surface-contact with a radially outward surface of the flat surface portion 10b of the intermediate foil piece 10a, and energy dissipation attributable to friction at the contact surface is likely to occur. The folded protruding portion 11g is continuously provided at the end portion of the flat portion 11i in the circumferential direction.

With the configuration, a contact portion that comes into contact with the flat surface portion 10b of the intermediate foil piece 10a is formed not only at the top portion of the hill part 11c but also at the flat portion 11i of the back foil pieces 11a. For this reason, a contact area between the intermediate foil piece 10a and the back foil piece 11a can be increased, a damping effect attributable to friction between the intermediate foil piece 10a and the back foil piece 11a can be increased, and the stability when the rotary shaft 1 rotating at a high speed is supported can be further increased.

Figure 18:
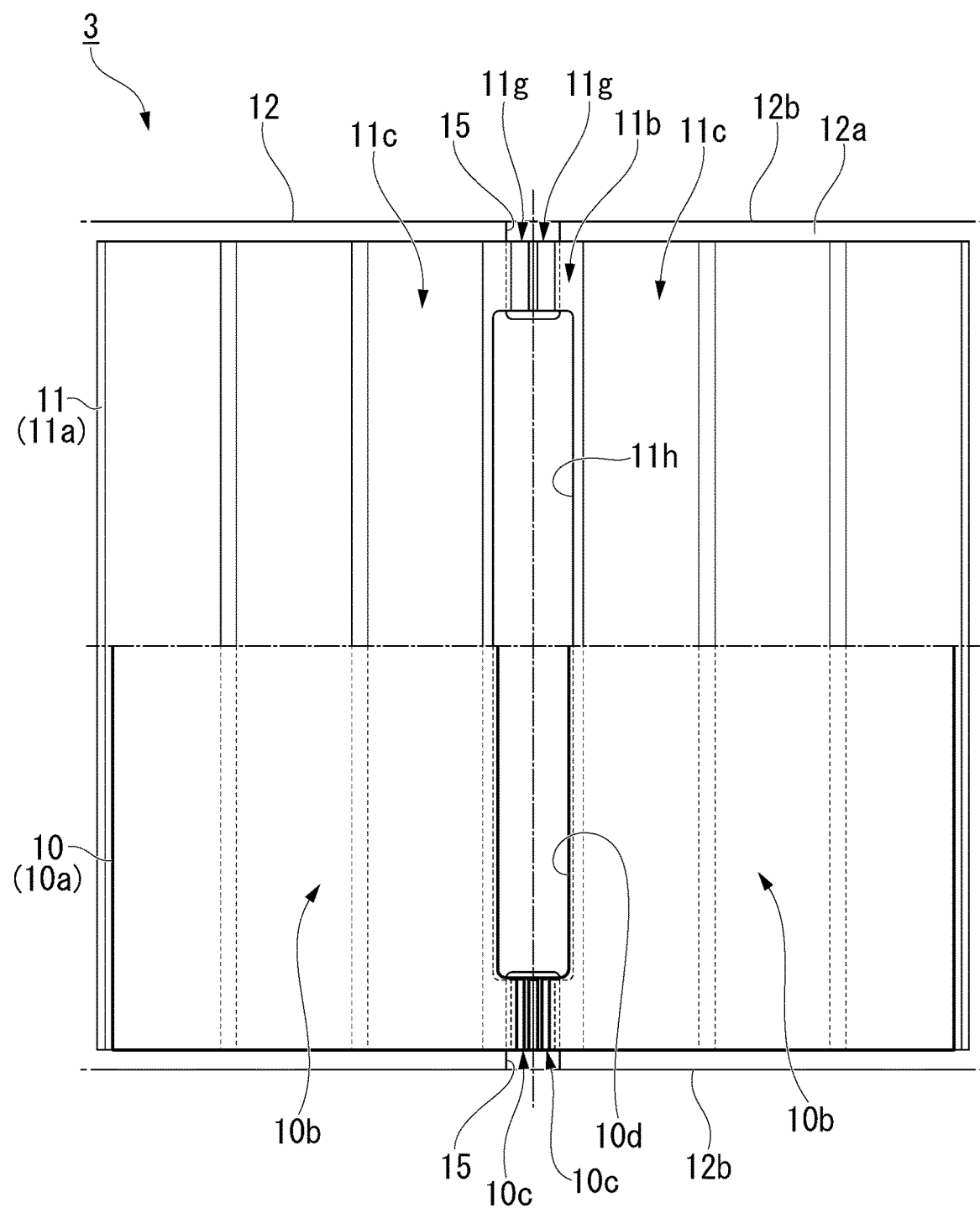
FIG. 18 is a plan view viewed from a radial direction with main portions of a radial foil bearing according to a second modification example of the second embodiment of the present disclosure flattened.
Figure 19:
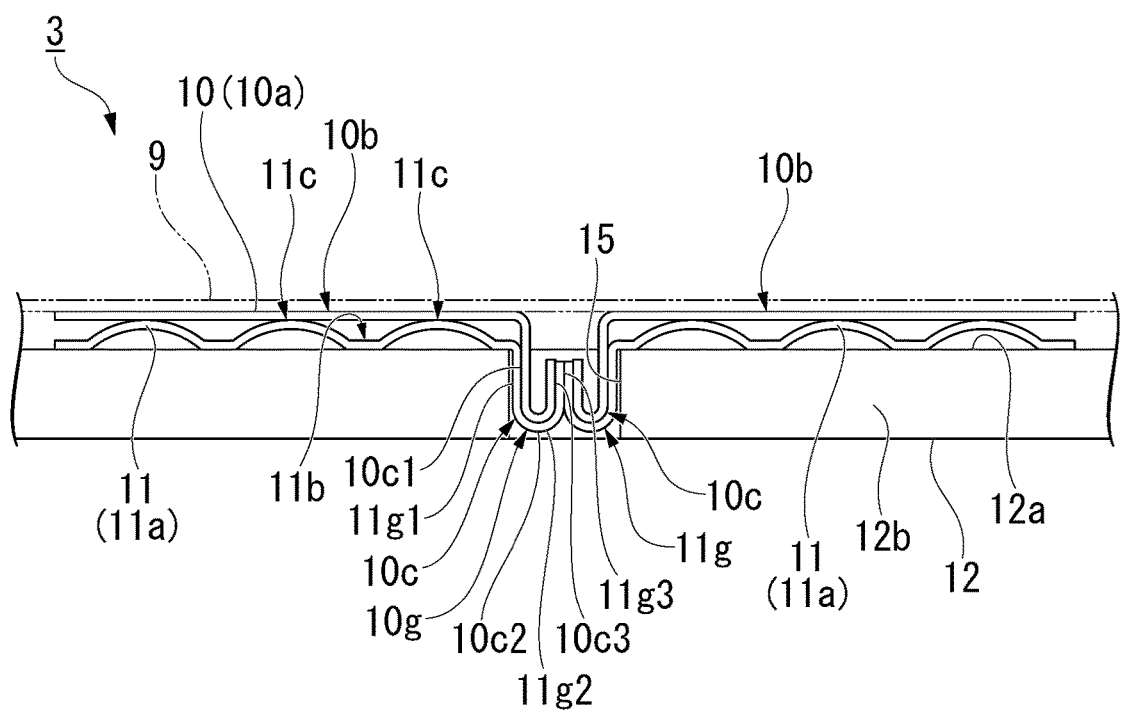
FIG. 19 is a front view viewed from an axial direction with the main portions of the radial foil bearing according to the second modification example of the second embodiment of the present disclosure flattened.

In addition, the radial foil bearing 3 of the second embodiment may further adopt the configurations shown in FIGS. 18 and 19.

FIG. 18 is a plan view viewed from the radial direction with main portions of the radial foil bearing 3 according to a second modification example of the second embodiment of the present disclosure flattened. On the upper side of the page of FIG. 18, the intermediate foil piece 10a on the back foil piece 11a is not shown for the sake of the improvement of visibility. FIG. 19 is a front view viewed from the axial direction with the main portions of the radial foil bearing 3 according to the second modification example of the second embodiment of the present disclosure flattened.

The back foil piece 11a of the radial foil bearing 3 shown in FIGS. 18 and 19 has a structure where the back foil piece 11a is separated into two at the middle portion in the circumferential direction. The folded protruding portion 11g is provided at each of the back foil pieces 11a which are separated from and adjacent to each other in the circumferential direction, and the folded protruding portions 11g, which are adjacent to each other in the circumferential direction, are disposed in one fitting groove 15 in a state where the folded protruding portions 11g face each other (see FIG. 19).

Specifically, the folded protruding portion 11g of each of the back foil pieces 11a adjacent to each other in the circumferential direction has the extension portion 11g1, the connection portion 11g2, and the return portion 11g3. In the present modification example, the return portion 11g3 is not connected to the valley part 11b, and forms an end portion of the back foil piece 11a in the circumferential direction. The return portions 11g3 of the back foil pieces 11a adjacent to each other in the circumferential direction are in contact with each other in the circumferential direction. In addition, also the intermediate foil piece 10a has a structure where the intermediate foil piece 10a is separated into two at the middle portion in the circumferential direction, and the folded protruding portions 10c of the intermediate foil pieces 10a are respectively fitted to spaces inside the folded protruding portions 11g of the back foil pieces 11a. The two separated parts of the intermediate foil piece 10a, which are arranged in the circumferential direction, are not in contact with each other. With the configuration, a "slip" occurs at a contact portion (the return portion 11g3) between the folded protruding portions 11g of the back foil pieces 11a adjacent to each other in the circumferential direction, and a "slip" occurs at a contact portion between the folded protruding portion 11g and the folded protruding portion 10c fitted to the inside of the folded protruding portion 11g. Therefore, a damping effect attributable to friction increases, and the stability when the rotary shaft 1 rotating at a high speed is supported can be further increased.

Third Embodiment

Next, a third embodiment of the present invention will be described. In the following description, configurations which are the same or equivalent to the embodiment described above will be assigned with the same reference signs, and a description thereof will be simplified or omitted.

Figure 20:
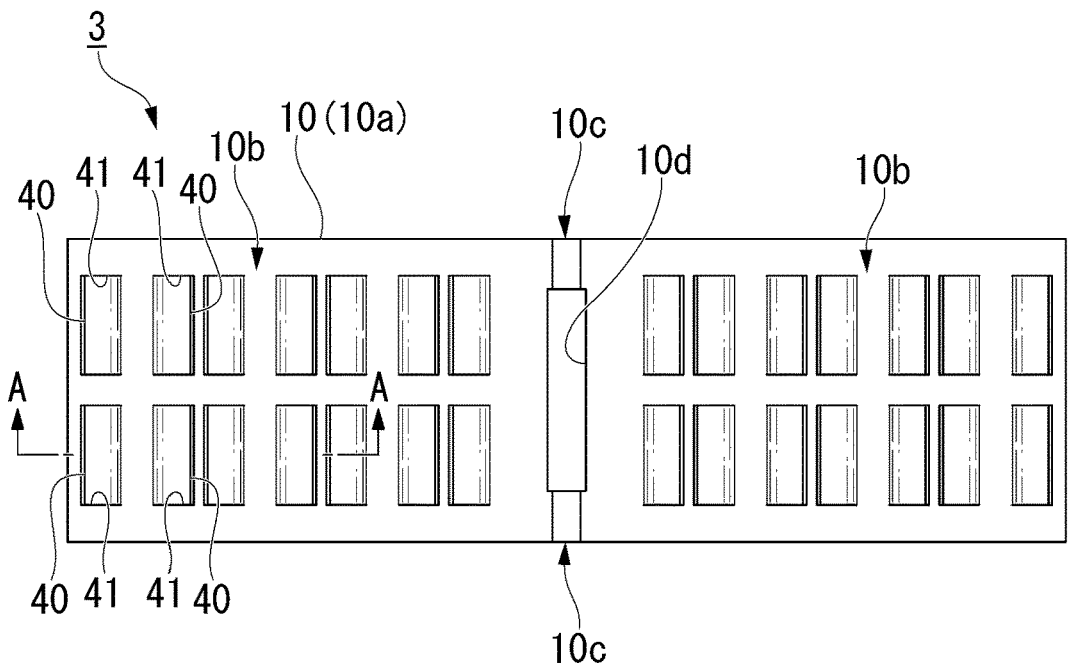
FIG. 20 is a plan view viewed from a radial direction with main portions of a radial foil bearing according to a third embodiment of the present disclosure flattened.
Figure 21:
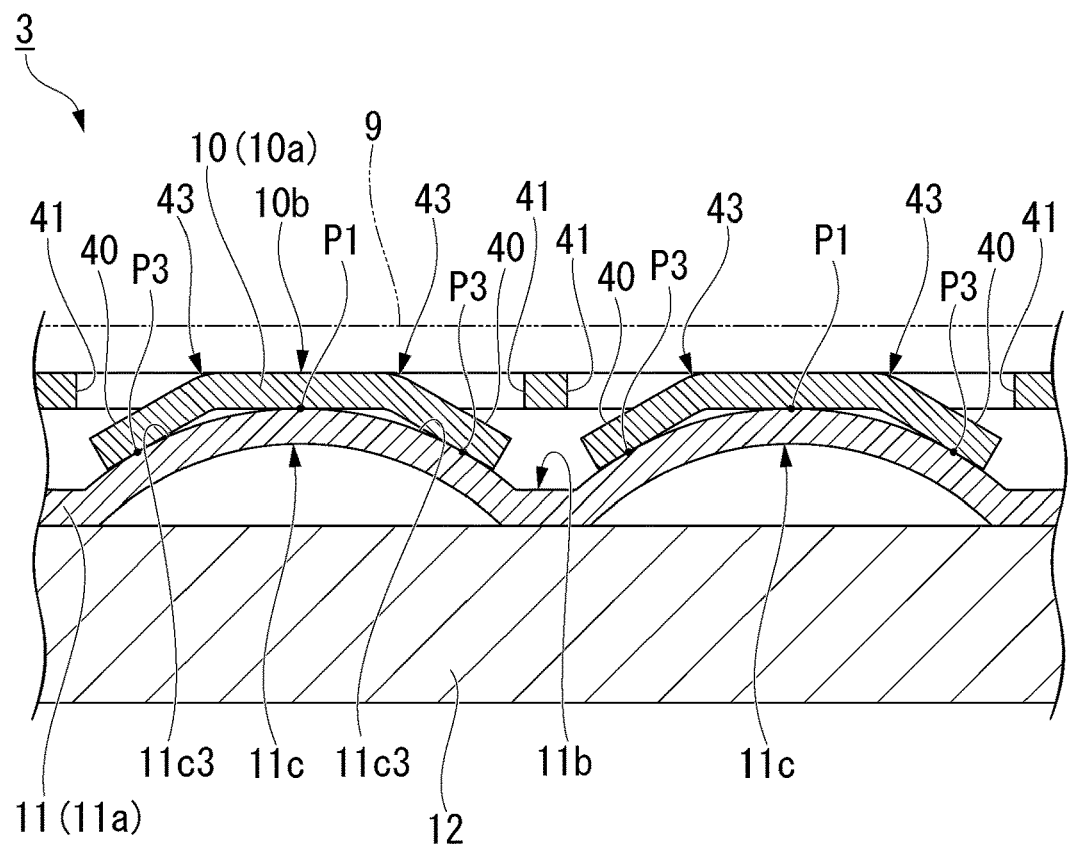
FIG. 21 is a cross-sectional view of the main portions shown in FIG. 20, which is taken along arrow A-A.

FIG. 20 is a plan view viewed from the radial direction with main portions of the radial foil bearing 3 according to the third embodiment of the present disclosure flattened. FIG. 21 is a cross-sectional view of the main portions shown in FIG. 20, which is taken along arrow A-A.

The third embodiment is different from the first and second embodiments in that branch pieces 40 (protrusion portions) branched from the flat surface portion 10b is provided at the intermediate foil 10 (intermediate foil piece 10a). That is, a part protruding radially outward from a radially outward surface of the intermediate foil piece 10a is formed.

As shown in FIG. 20, the branch piece 40 is obtained by forming a slit 41 in the flat surface portion 10b and causing a portion surrounded by the slit 41 to overhang (cut and raise) so that the branch piece 40 protrudes radially outward. In the present disclosure, the slit 41 is formed by two notches which are parallel to the circumferential direction and one notch which is parallel to the axial direction and connects end portions of these two notches to each other. The rectangular branch piece 40 surrounded by the slit 41 obliquely overhangs to protrude radially outward. That is, the branch piece 40 extends from end portions (hereinafter, also referred to as slit end portions), which are not connected to the notch parallel to the axial direction, of the two notches parallel to the circumferential direction. The branch piece 40 is spaced apart from the end portions (slit end portions), which are not connected to the notch parallel to the axial direction, in the circumferential direction, and is also spaced apart radially outward. That is, the branch piece 40 is spaced apart from the end portions (slit end portions), which are not connected to the notch parallel to the axial direction, in the circumferential direction, and a radial position of the branch piece 40 monotonically increases outward in the radial direction. The branch piece 40 protrudes to the back foil piece 11a side at a circumferential position between a top portion of at least any one of the hill parts 11c and a top portion of the hill part 11c adjacent to this hill part 11c, in the corrugated plate shape of the back foil piece 11a.

In addition, as shown in FIG. 21, a pair of branch pieces 40 are provided such that the hill part 11c of the back foil piece 11a is sandwiched therebetween. That is, the slits 41 are formed on both sides of a position corresponding to the hill part 11c of the back foil piece 11a, and the set of branch pieces 40 cut and raised from the slits 41 extend such that the branch pieces 40 are separated from each other. That is, two notches, which are parallel to the circumferential direction and are spaced apart from each other in the circumferential direction, are provided to overlap the circumferential position of one hill part 11c. That is, two sets of two notches parallel to the circumferential direction are provided for one hill part 11c, and the two sets are spaced apart from each other in the circumferential direction, but are disposed to overlap the circumferential position of one hill part 11c. A notch parallel to the axial direction extends from end portions, on a side spaced apart from the other set, of one set of the two notches parallel to the circumferential direction. With this configuration, the two branch pieces 40 are configured such that one hill part 11c is sandwiched therebetween, both ends of the two branch pieces 40 in the circumferential direction protrude radially outward, and a space therebetween is positioned radially inward. The two branch pieces 40 (a set of branch pieces) provided with the hill part 11c of the back foil piece 11a sandwiched therebetween in the circumferential direction come into contact with the hill part 11c such that the hill part 11c of the back foil piece 11a is sandwiched from both sides in the circumferential direction by the two branch pieces 40. In the present disclosure, as shown in FIG. 20, the slits 41 are provided in two rows in the flat surface portion 10b, and four branch pieces 40 are in contact with one hill part 11c. The slits 41 (branch pieces 40) may be provided in a single row or may be provided in three or more rows.

In addition, on the flat surface portion 10b of the intermediate foil 10, a branch position 43 where the branch piece 40 branches from the flat surface portion 10b is provided between a top portion of the first hill part 11c (the hill part 11c on the left shown in FIG. 21) and a top portion of the second hill part 11c (the hill part 11c on the right shown in FIG. 21), which are adjacent to each other in a circumferential direction of the back foil 11. The flat surface portion 10b is a portion of the intermediate foil 10 placed on a flat surface obtained by tracing a substantially circular closed curve, which surrounds the intermediate foil 10 in the circumferential direction and does not include the branch piece 40, in the axial direction of the intermediate foil 10. In addition, in the present disclosure, on the flat surface portion 10b, the first branch position 43 (the branch position 43 on the left shown in FIG. 21) is provided between the top portion of the first hill part 11c and the top portion of the second hill part 11c, and the second branch position 43 (the branch position 43 on the right shown in FIG. 21) is provided at a position different from the first branch position 43. That is, the two branch pieces 40 are formed between the top portion of the first hill part 11c and the top portion of the second hill part 11c, which are adjacent to each other in the circumferential direction of the back foil 11. In other words, the two branch positions 43 are arranged in the circumferential direction between the valley parts 11b adjacent to each other in the circumferential direction. In the radial foil bearing 3 of the present disclosure, in a state where the inserted rotary shaft 1 is not rotating, the intermediate foil piece 10a and the back foil piece 11a are spaced apart from each other in the radial direction at the radial position of the branch position 43.

The pair of branch pieces 40 that open in a direction separating away from each other are in contact with positions (side surfaces 11c3) of the hill part 11c on both sides in the circumferential direction with the top portion of the hill part 11c sandwiched therebetween. That is, on the intermediate foil piece 10a, in addition to a contact point P1 where the flat surface portion 10b comes in contact with the top portion of the hill part 11c of the back foil piece 11a, a contact point P3 where the branch piece 40 comes in contact with a place (side surface 11c3) of the hill part 11c other than the top portion of the hill part 11c of the back foil piece 11a is formed.

Here, in a state where the inserted rotary shaft 1 is not rotating, there may be a case where a contact point is not present between the two contact points P3 between which the top portion of the hill part 11c is sandwiched. Even in this case, when the inserted rotary shaft 1 rotates, the contact point P1 is generated between the two contact points P3 which sandwiches the top portion of the hill part 11c therebetween. In addition, a radially outward surface of the branch piece 40 extends beyond the contact point P3 from a side of the top portion of the hill part 11c toward the valley part 11b adjacent to the hill part 11c. However, the radially outward surface of the branch piece 40 does not reach the radial position of the valley part 11b adjacent to the hill part 11c.

The side surface 11c3 of the hill part 11c is a curved surface, and the branch piece 40 that comes into contact with the side surface 11c3 is a flat surface. That is, since the side surface 11c3 of the hill part 11c and the branch piece 40 come into contact with each other at one point, which is the contact point P3, and are separated from each other at other places, a "slip" is likely to occur at the contact point P3.

With the third embodiment having the configuration, the branch position 43 and the second branch position 43 where the branch pieces 40 branch from the flat surface portions 10b are provided between the top portion of the first hill part 11c and the top portion of the second hill part 11c, which are adjacent to each other in the circumferential direction of the back foil 11. In addition, as shown in FIG. 21, the branch piece 40 is in contact with a place of the hill part 11c other than the top portion of the hill part 11c of the back foil 11. Therefore, the intermediate foil 10 and the back foil 11 come into contact with each other not only at the flat surface portion 10b but also at the branch piece 40 branched from the flat surface portion 10b. Therefore, since the number of contact positions between the intermediate foil 10 and the back foil 11 increases, a damping effect attributable to friction between the intermediate foil 10 and the back foil 11 increases. That is, the two contact points P3 are formed for one hill part 11c.

In addition, the pair of branch pieces 40 are provided such that the hill part 11c of the back foil 11 is sandwiched therebetween. Therefore, even in any case where the back foil 11 deforms to extend or contact in the circumferential direction, a contact state between the branch pieces 40 and the hill part 11c can be maintained at all times, and a damping effect attributable to friction between the intermediate foil 10 and the back foil 11 can be increased.

Figure 22:
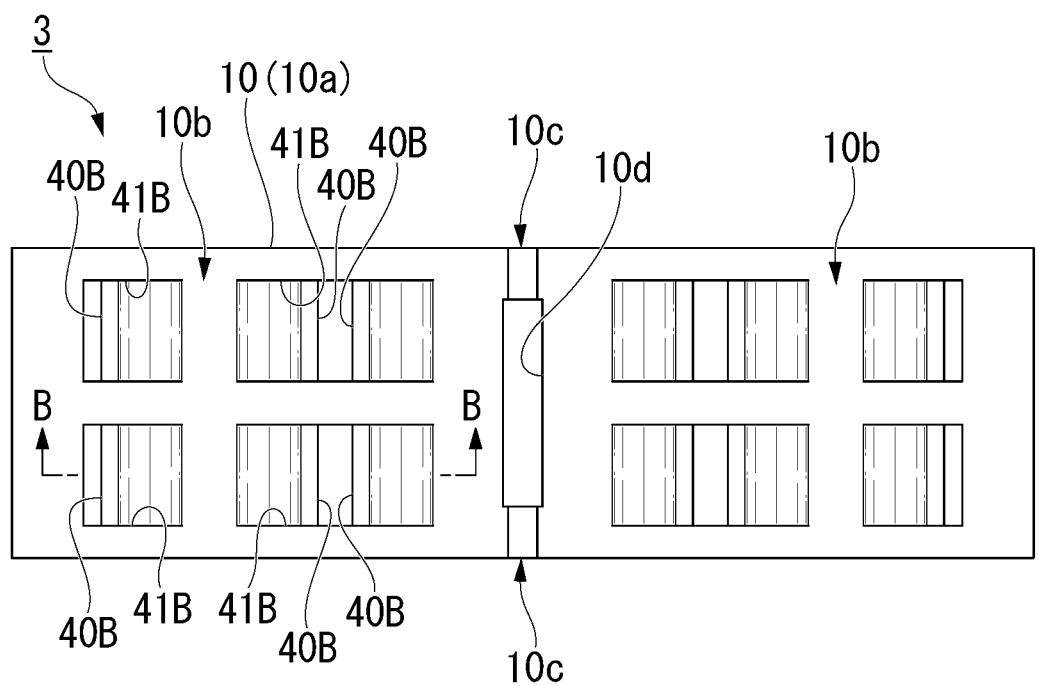
FIG. 22 is a plan view viewed from a radial direction with main portions of a radial foil bearing according to a modification example of the third embodiment of the present disclosure flattened.
Figure 23:
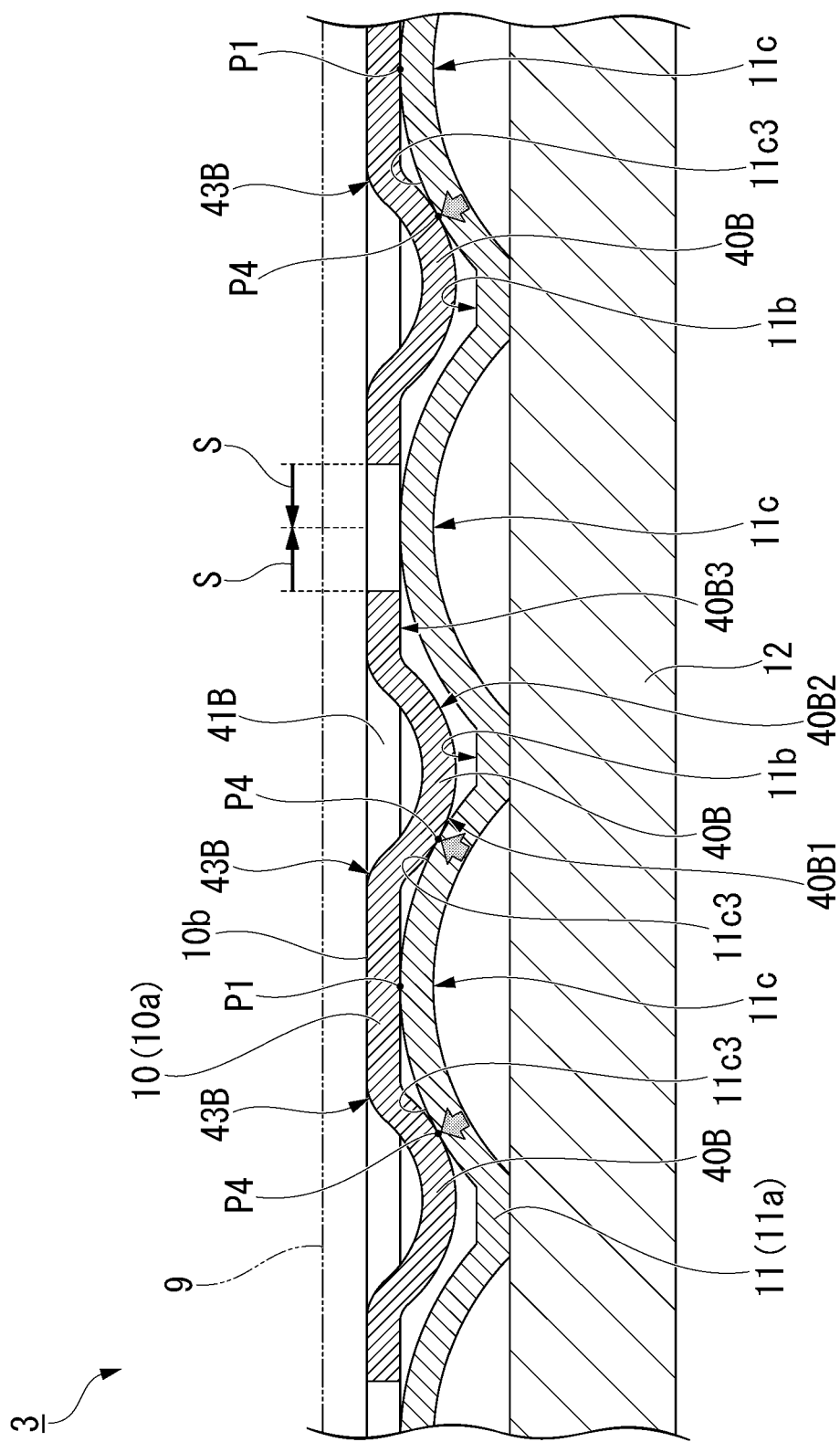
FIG. 23 is a cross-sectional view of the main portions shown in FIG. 22, which is taken along arrow B-B.

The radial foil bearing 3 of the third embodiment may adopt the configurations shown in FIGS. 22 and 23.

FIG. 22 is a plan view viewed from the radial direction with main portions of the radial foil bearing 3 according to a first modification example of the third embodiment of the present disclosure flattened. FIG. 23 is a cross-sectional view of the main portions shown in FIG. 22, which is taken along arrow B-B.

The intermediate foil 10 shown in FIGS. 22 and 23 includes, instead of the branch pieces 40, branch pieces 40B having a shape different from the branch piece 40.

As shown in FIG. 22, the branch piece 40B is obtained by forming a slit 41B in the flat surface portion 10b and causing a portion surrounded by the slit 41B to overhang so that the branch piece 40B protrudes radially outward. That is, the branch piece 40B of the present disclosure protrudes radially outward from the flat surface portion 10b along the circumferential direction, and extends radially inward after passing through a protruding peak thereof. In the present disclosure, the slit 41B is formed in an H-shape. Two branch pieces 40B formed by the slit 41B have a corrugated shape by overhanging in a curved surface to protrude radially outward. That is, when viewed in the circumferential direction, the branch pieces 40B respectively extend from both ends, in the circumferential direction, of a rectangularly cut out notch toward the other end side. Tips of the two branch pieces 40B are spaced apart from each other in the circumferential direction.

As shown in FIG. 23, the branch piece 40B is disposed at a position corresponding to the valley part 11b of the back foil piece 11a. That is, the branch piece 40B extends between the hill parts 11c adjacent to both sides of the valley part 11b in the circumferential direction, including the radial position of the valley part 11b. However, the tip of the branch piece 40B is positioned closer to the valley part 11b side than the top of the hill part 11c. Accordingly, the branch piece 40B extends between the circumferential positions of the adjacent hill parts 11c including one hill part 11c. As shown in FIG. 22, at the middle portion of the slit 41B, there is a region where the back foil 11 is exposed when viewed from the radial direction. In the exposed region, a position corresponding to the top portion of the hill part 11c of the back foil piece 11a is exposed. The two branch pieces 40B are cut and raised from the slit 41B so that the two branch pieces 40B are deformed in a curved surface to be separated away from each other. As shown in FIG. 23, the two branch pieces 40B come into contact with the hill parts 11c and 11c disposed on both sides of the hill part 11c disposed at the position corresponding to the middle portion of the slit 41B. That is, the hill part 11c sandwiched between the branch pieces 40B from both sides in the circumferential direction and the hill part 11c which is not sandwiched between the branch pieces 40B from both sides in the circumferential direction are alternately disposed. In other words, the top portion of the hill part 11c of the back foil piece 11a and the peak of the branch piece 40B appear alternately in the circumferential direction. Further, in other words, the peak of one branch piece 40B is positioned between the top portion of the hill part 11c and the top portion of the hill part 11c adjacent thereto. The peak referred to herein is a peak at a radial position.

On the flat surface portion 10b, a branch position 43B where the branch piece 40B branches from the flat surface portion 10b is provided between the top portion of the first hill part 11c and the top portion of the second hill part 11c, which are adjacent to each other in the circumferential direction of the back foil 11. That is, one branch piece 40B is formed between the top portion of the first hill part 11c and the top portion of the second hill part 11c, which are adjacent to each other in the circumferential direction of the back foil 11. The branch piece 40B includes a spaced portion 40B1 that is spaced apart from the flat surface portion 10b and extends radially outward, an approaching portion 40B2 that extends from the spaced portion 40B1 and approaches radially inward toward the flat surface portion 10b, and a tip portion 40B3 that extends from the approaching portion 40B2 and extends along the flat surface portion 10b. The spaced portion 40B1 and the approaching portion 40B2 are formed in a smooth curved surface with the same curvature radius. The spaced portion 40B1 and the approaching portion 40B2 may be a combination of a linear shape and a linear shape, or may be a combination of a linear shape and a curved shape.

The spaced portion 40B1 of the branch piece 40B is in contact with the side surface 11c3 of the hill part 11c. That is, on the intermediate foil piece 10a, in addition to the contact point P1 where the flat surface portion 10b is in contact with the top portion of the hill part 11c of the back foil piece 11a, a contact point P4 where the spaced portion 40B1 of the branch piece 40B is in contact with a place (side surface 11c3) of the hill part 11c other than the top portion of the hill part 11c of the back foil piece 11a is formed. The side surface 11c3 of the hill part 11c is a curved surface, and the spaced portion 40B1 of the branch piece 40B that comes into contact with the side surface 11c3 is a curved surface. The side surface 11c3 and the spaced portion 40B1 are curved surfaces convex toward each other. That is, since the side surface 11c3 of the hill part 11c and the spaced portion 40B1 of the branch piece 40B come into contact with each other at one point, which is the contact point P4, and are separated from each other at other places, a "slip" is likely to occur at the contact point P4. That is, in the present disclosure, the contact points P4 are configured by the two branch pieces 40B between which the top portion of one hill part 11c is sandwiched. On the other hand, the hill part 11c adjacent to this hill part 11c does not include a contact point with the branch piece 40B. In addition, the length of the branch piece 40B from the contact point P4 to the tip of the branch piece 40B is larger than the length of the branch piece 40B from the branch position 43B to the contact point P4. In the present disclosure, the length from the contact point P4 to the tip of the branch piece 40B is larger than the length from the top portion of the hill part 11c, which is sandwiched between the contact points P4, to the contact point P4.

With the configuration, the branch position 43B where the branch piece 40B branches from the flat surface portion 10b is provided between the top portion of the first hill part 11c and the top portion of the second hill part 11c, which are adjacent to each other in the circumferential direction of the back foil 11. In addition, as shown in FIG. 23, the branch piece 40B is in contact with a place of the hill part 11c other than the top portion of the hill part 11c of the back foil 11. Therefore, the intermediate foil 10 and the back foil 11 come into contact with each other not only at the flat surface portion 10b but also at the branch piece 40B branched from the flat surface portion 10b. Therefore, since the number of contact positions between the intermediate foil 10 and the back foil 11 increases, a damping effect attributable to friction between the intermediate foil 10 and the back foil 11 increases.

In addition, the pair of branch pieces 40B are provided such that the hill part 11c is sandwiched therebetween. Therefore, even in any case where the back foil 11 deforms to extend or contract in the circumferential direction, the branch pieces 40B and the hill part 11c can come into contact with each other. In addition, the branch piece 40B is formed in a corrugated shape including the spaced portion 40B1 that is spaced apart from the flat surface portion 10b and extends radially outward and the approaching portion 40B2 that extends from the spaced portion 40B1 and approaches radially inward toward the flat surface portion 10b. When the back foil 11 is deformed in the circumferential direction, the branch piece 40B is pressed by the hill part 11c, causing lateral slip as indicated by the reference sign S in FIG. 23 as if it were the back foil 11 (bump foil).

At this time, since a "slip" occurs between the tip portion 40B3 of the branch piece 40B and the top foil 9, a damping effect attributable to friction further increases.

Fourth Embodiment

Next, a fourth embodiment of the present invention will be described. In the following description, configurations which are the same or equivalent to the embodiment described above will be assigned with the same reference signs, and a description thereof will be simplified or omitted.

Figure 24:
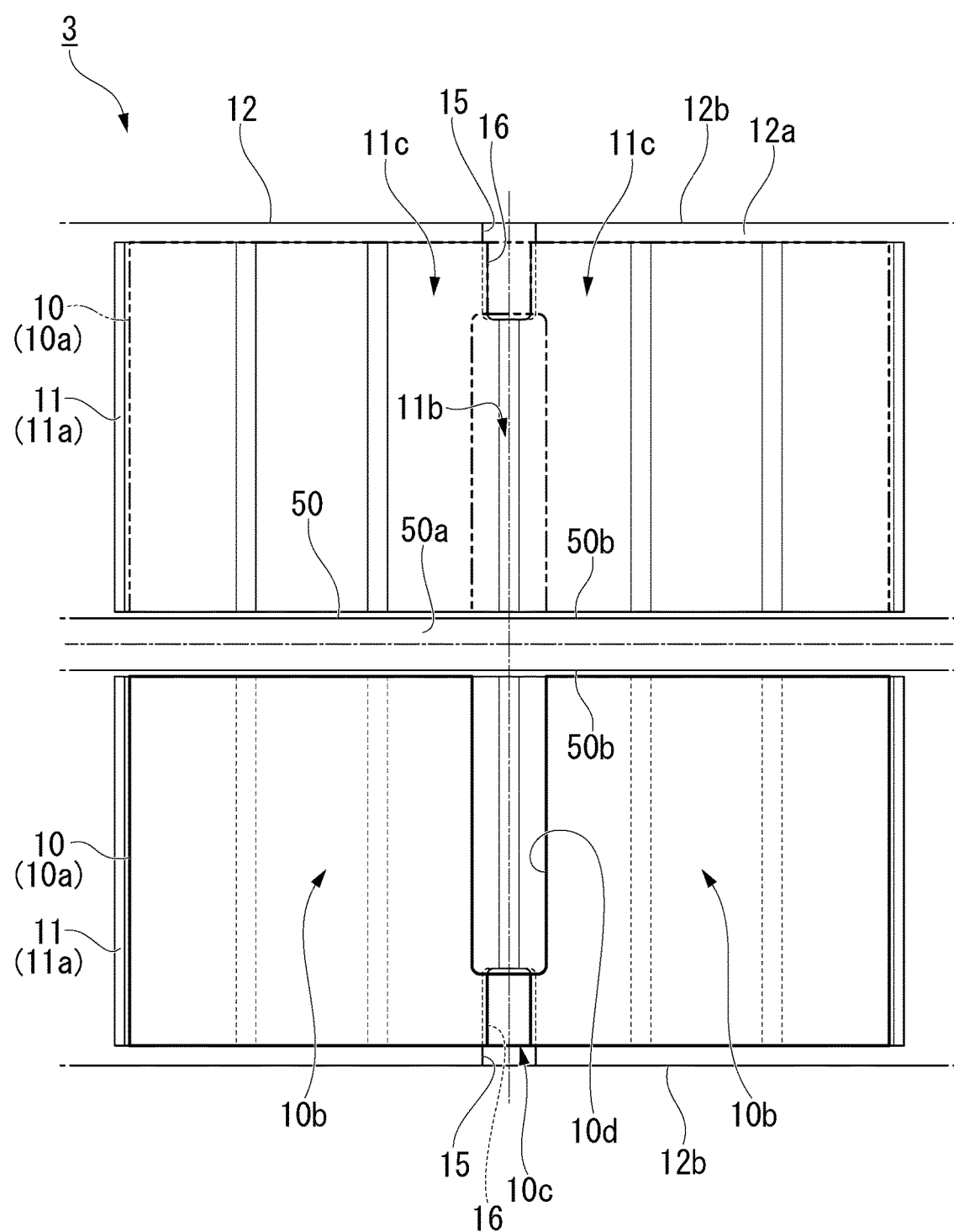
FIG. 24 is a plan view viewed from a radial direction with main portions of a radial foil bearing according to a fourth embodiment of the present disclosure flattened.
Figure 25A:
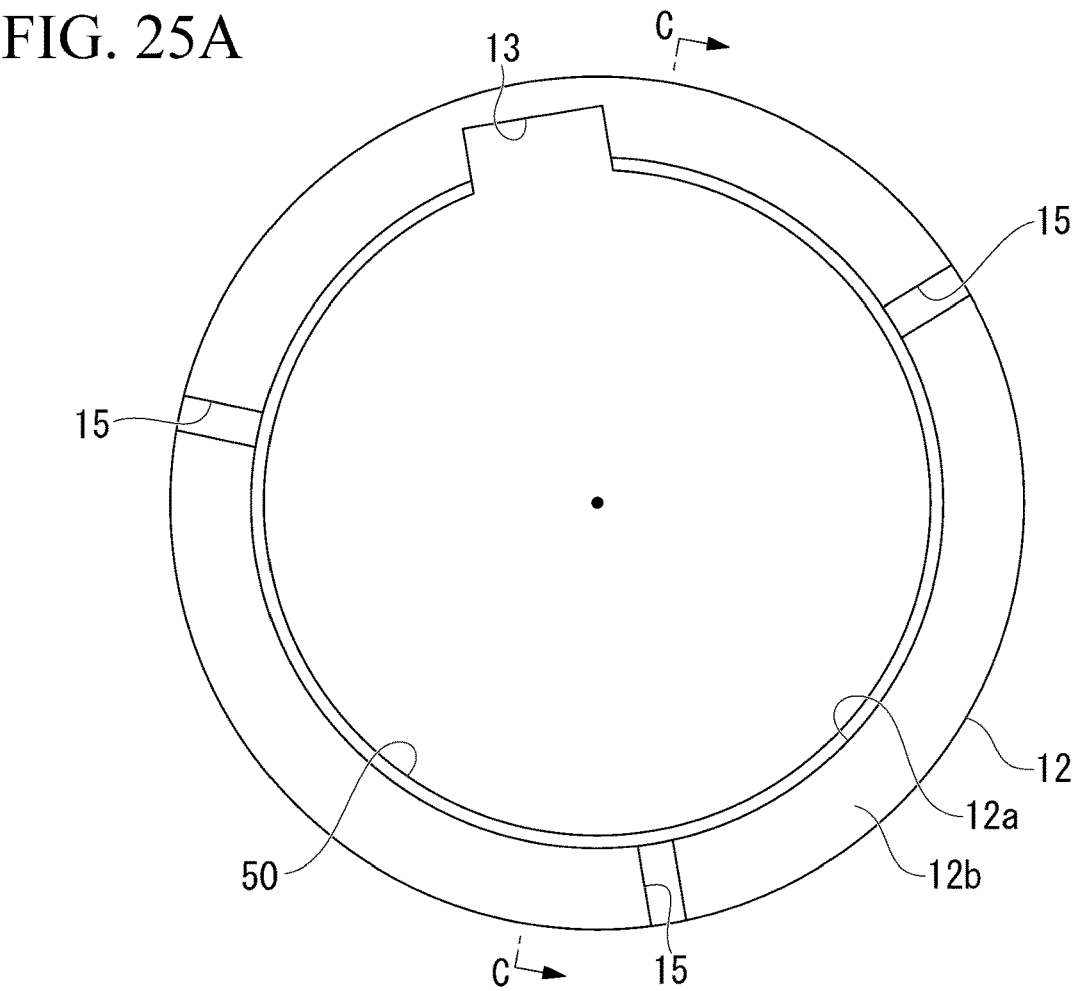
FIG. 25A is a front view of a bearing housing according to the fourth embodiment of the present disclosure.
Figure 25B:
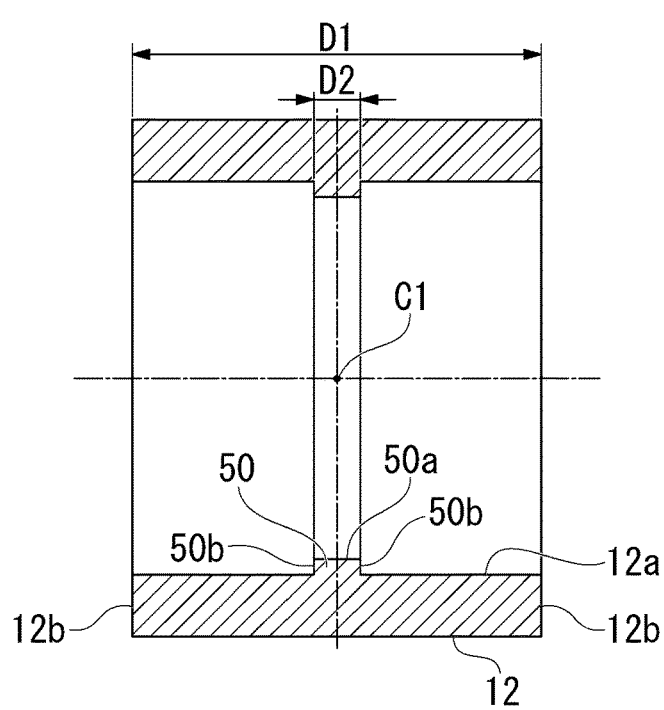
FIG. 25B is a cross-sectional view of the bearing housing according to the fourth embodiment of the present disclosure, which is taken along arrow C-C.

FIG. 24 is a plan view viewed from the radial direction with main portions of the radial foil bearing 3 according to the fourth embodiment of the present disclosure flattened. On the upper side of the page of FIG. 24, the intermediate foil piece 10a on the back foil piece 11a is not shown for the sake of the improvement of visibility. FIG. 25A is a front view of the bearing housing 12 according to the fourth embodiment of the present disclosure. FIG. 25B is a cross-sectional view of the bearing housing 12 taken along arrow C-C.

As shown in FIG. 25A, a protrusion portion 50 that protrudes radially inward (inner diameter side) from the inner peripheral surface of the insertion hole 12a is provided on the bearing housing 12 of the fourth embodiment. The protrusion portion 50 of the present disclosure is formed integrally with the bearing housing 12. The protrusion portion 50 may be attached to the bearing housing 12 as a separate member. The protrusion portion 50 is formed in a ring shape along the circumferential direction of the inner peripheral surface of the insertion hole 12a. More specifically, the protrusion portion 50 is formed in a C-shape over substantially the entire periphery on the inner peripheral surface of the insertion hole 12a excluding the through-groove 13.

As shown in FIG. 25B, the protrusion portion 50 has a flat top wall portion 50a that is positioned (decreased in diameter) radially inward from the inner peripheral surface of the insertion hole 12a and extends along the circumferential direction and a pair of side wall portions 50b that are positioned at both ends of the top wall portion 50a in the axial direction and extend radially outward toward the inner peripheral surface of the insertion hole 12a. The side wall portions 50b extend perpendicularly to the top wall portion 50a. The protrusion portion 50 includes the top wall portion 50a provided in an area in the axial direction within a range of ±5% from a middle position C1 of the insertion hole 12a in the axial direction.

That is, the top wall portion 50a of the protrusion portion 50 extends, by a length that is 5% of the width of the insertion hole 12a (bearing housing 12) in the axial direction, from the middle position C1 of the insertion hole 12a in the axial direction toward both sides in the axial direction. That is, when the full width of the insertion hole 12a (bearing housing 12) in the axial direction is set to D1 and the full width of the top wall portion 50a in the axial direction is set to D2, D2 may be formed within a range of 10% of D1. It does not mean that an effect does not occur unless D2 is formed within the range of 10% of D1.

As shown in FIG. 24, the back foil 11 of the fourth embodiment is configured such that the back foil 11 of the first embodiment is separated in the axial direction of the insertion hole 12a. The back foil 11 (hereinafter, referred to as a first back foil 11) disposed on a first side (the upper side of the page of FIG. 24) in the axial direction with respect to the protrusion portion 50 has the notch 16 formed in the end edge on the first side in the axial direction, and the folded protruding portion 10c of the intermediate foil 10 is inserted in the notch 16. The notch 16 is not formed in the end edge of the first back foil 11 on a second side in the axial direction. The end edge of the first back foil 11 on the second side in the axial direction is disposed to be in contact with the side wall portion 50b of the protrusion portion 50 in the axial direction or with a slight gap therebetween.

In addition, the back foil 11 (hereinafter, referred to as a second back foil 11) disposed on the second side (the lower side of the page of FIG. 24) in the axial direction with respect to the protrusion portion 50 also has the notch 16 (not shown) formed in the end edge on the second side in the axial direction, and the folded protruding portion 10c of the intermediate foil 10 is inserted in the notch 16. The notch 16 is not formed in the end edge of the second back foil 11 on the first side in the axial direction. The end edge of the second back foil 11 on the first side in the axial direction is disposed to be in contact with the side wall portion 50b of the protrusion portion 50 in the axial direction or with a slight gap therebetween.

That is, the back foil 11 includes four end edges (i.e., two end edges of the first back foil 11 and two end edges of the second back foil 11) that extend in a direction intersecting the axial direction with the protrusion portion 50 sandwiched therebetween. In other words, the back foil 11 includes four end edges when viewed in the axial direction. The notches 16 are formed in the end edges of the back foil 11 on both sides in the axial direction, and are engaged with the intermediate foil 10. On the other hand, the notch 16 is not formed in the end edges of the back foil 11 that face the protrusion portion 50, that is, two end edges positioned axially inward, and the two end edges are in contact with the side wall portions 50b of the protrusion portion 50 in the axial direction or are disposed with a slight gap therebetween.

In addition, also the intermediate foil 10 of the fourth embodiment is separated in the axial direction of the insertion hole 12a at the protrusion portion 50. The intermediate foil 10 (hereinafter, referred to as a first intermediate foil 10) disposed on the second side (the lower side of the page of FIG. 24) in the axial direction with respect to the protrusion portion 50 has the folded protruding portion 10c formed in the end edge on the second side in the axial direction, and is inserted in the notch 16 of the back foil 11. The folded protruding portion 10c is not formed at the end edge of the first intermediate foil 10 on the first side in the axial direction. The end edge of the first intermediate foil 10 on the first side in the axial direction is disposed to be in contact with the side wall portion 50b of the protrusion portion 50 in the axial direction or with a slight gap therebetween.

In addition, the intermediate foil 10 (hereinafter, referred to as a second intermediate foil 10) disposed on the first side (the upper side of the page of FIG. 24) in the axial direction with respect to the protrusion portion 50 has the folded protruding portion 10c (not shown) formed at the end edge on the first side in the axial direction, and is engaged with the back foil 11. The folded protruding portion 10c is not formed at the end edge of the second intermediate foil 10 on the second side in the axial direction. The end edge of the second intermediate foil 10 on the second side in the axial direction is disposed to be in contact with the side wall portion 50b of the protrusion portion 50 in the axial direction or with a slight gap therebetween.

That is, the intermediate foil 10 includes four end edges (i.e., two end edges of the first intermediate foil 10 and two end edges of the second intermediate foil 10) that extend in a direction intersecting the axial direction with the protrusion portion 50 sandwiched therebetween. In other words, the intermediate foil 10 includes four end edges when viewed in the axial direction. The folded protruding portions 10c are formed at the end edges of the intermediate foil 10 on both sides in the axial direction, and are engaged with the back foil 11. On the other hand, the folded protruding portion 10c is not formed at the end edges of the intermediate foil 10 that face the protrusion portion 50, that is, two end edges positioned axially inward, and the two end edges are in contact with the side wall portions 50b of the protrusion portion 50 in the axial direction or are disposed with a slight gap therebetween.

The top foil 9 is not separated in the axial direction, and is supported by each of the two back foils 11 and the two intermediate foils 10, which are separated from each other in the axial direction. A gap is formed between the separated first and second back foils 11 and between the separated first and second intermediate foils 10, and the protrusion portion 50 is disposed in the gap. That is, parts of each of the back foil 11 and the intermediate foil 10, between which the protrusion portion 50 is sandwiched, supports the top foil 9. That is, the top wall portion 50a faces the top foil 9 in the radial direction. The top foil 9 is disposed to overlap the protrusion portion 50 in the radial direction of the insertion hole 12a. The top wall portion 50a of the protrusion portion 50 faces an outer peripheral surface (back surface) of the top foil 9 with a gap in the radial direction of the insertion hole 12a.

The protrusion portion 50 extends from the inner peripheral surface of the insertion hole 12a to a radial position which is radially outward (outer diameter side) from the top portion of the hill part 11c of the back foil 11. That is, the protrusion portion 50 does not protrude radially inward (inner diameter side) from the top portion of the hill part 11c. For this reason, in a case where no load acts on, the top wall portion 50a of the protrusion portion 50 is spaced apart from the outer peripheral surface of the top foil 9. The height of the protrusion portion 50 may be, for example, 75% or less of the full height of the hill part 11c.

The protrusion portion 50 extends to a radial position which is radially inward (inner diameter side) with respect to the valley part 11b of the back foil 11. Accordingly, as shown in FIG. 24, a part of the end edge of the back foil 11 facing the protrusion portion 50 can face the side wall portion 50b, and the back foil 11 is positioned in the axial direction.

In the fourth embodiment having the configuration, the operational effect (increasing a damping effect attributable to friction) of the first to third embodiments can be obtained. Further, when a large external force acts on the turbomachine in which the radial foil bearing 3 is incorporated, the displacement of the rotary shaft 1 in the radial direction can be prevented. That is, when a bearing load increases due to a strong external force, the back foil 11 is pressed down, and the outer diameter side (back side) of the top foil 9 starts to come into contact with the top wall portion 50a of the protrusion portion 50. In this state, even if the bearing load increases, the increased load is supported by the protrusion portion 50, and further displacement of the rotary shaft 1 in the radial direction is prevented. Therefore, the tip clearance 7 between the impeller 2 and the housing 6 shown in FIG. 1 is maintained, and contact between the impeller 2 and the housing 6 can be avoided.

In addition, as shown in FIG. 25A, the protrusion portion 50 includes the top wall portion 50a at an axial position within a range of ±5% from the middle position C1 of the insertion hole 12a in the axial direction. Therefore, the bending of the top foil 9 near the middle of the insertion hole 12a in the axial direction can be effectively prevented. That is, the pressure of the fluid lubrication film reaches its maximum near the middle of the insertion hole 12a in the axial direction and decreases toward both ends of the insertion hole 12a in the axial direction. That is, a rate of change in the pressure of the fluid lubrication film increases from the middle in the axial direction toward both ends in the axial direction. The top foil 9 may be supported by the top wall portion 50a near the peak of the fluid lubrication film. In the range of ±5% from the middle position C1 in the axial direction shown in FIG. 25B, the pressure does not significantly fluctuate compared to a peak pressure of the fluid lubrication film, and the support by the top wall portion 50a acts more effectively.

In addition, as shown in FIG. 25A, since the protrusion portion 50 of the present disclosure is formed in a ring shape along the circumferential direction of the inner peripheral surface of the insertion hole 12a, the bending of the top foil 9 near the middle of the insertion hole 12a in the axial direction can be prevented over the entire periphery. Further, as shown in FIG. 24, since the back foil 11 (or the intermediate foil 10) is separated in the axial direction of the insertion hole 12a, the back foil 11 can be disposed on the inner peripheral surface of the insertion hole 12a without interfering with the protrusion portion 50 formed in a ring shape.

Ring-shaped lid bodies may be attached to both of the end surfaces 12b of the bearing housing 12 in the axial direction. By covering the folded protruding portions 10c fitted to the fitting grooves 15 with the lid bodies, the intermediate foil 10 and the back foil 11 can be prevented from coming off the bearing housing 12 in the axial direction.

Hereinbefore, the embodiments of the present disclosure has been described with reference to the drawings, but the present disclosure is not limited to the above embodiments. The various shapes, combinations and the like of the components shown in the above-described embodiments are examples, and various modifications can be adopted based on design requirements and the like within the scope of the present disclosure.

For example, the configurations of the embodiments and modification examples can be replaced or combined as appropriate.

The present disclosure can be applied to a radial foil bearing.

What is claimed is:

1. A radial foil bearing comprising:
a bearing housing which has an insertion hole therein;
a top foil which is disposed inside the insertion hole; and
a foil structure which is interposed between the top foil and the bearing housing,
wherein the foil structure has a folded protruding portion that is bent outward in a radial direction of the insertion hole and is bent back inward in the radial direction,
the folded protruding portion is in contact with an inner surface of a fitting groove formed in an end surface of the bearing housing in an axial direction in an energy storing state and is fitted to the fitting groove, the axial direction being a direction in which the insertion hole extends,
the foil structure includes
a back foil disposed along an inner peripheral surface of the insertion hole, and
an intermediate foil that is supported by the back foil and is in contact with the top foil,
the intermediate foil has the folded protruding portion, and
a notch through which the folded protruding portion passes is formed in the back foil.

2. The radial foil bearing according to claim 1,
wherein the folded protruding portion is provided at each of end edges of the foil structure on both sides in the axial direction.

3. The radial foil bearing according to claim 2,
wherein the foil structure has a hole portion provided between the folded protruding portions formed at the end edges on both sides in the axial direction.

4. The radial foil bearing according to claim 1,
wherein the foil structure is formed by a plurality of foil pieces disposed in a circumferential direction of the insertion hole, and
the folded protruding portion is provided at each of adjacent foil pieces of the plurality of foil pieces adjacent to each other in the circumferential direction, and the folded protruding portions adjacent to each other in the circumferential direction are disposed in one fitting groove in a state where the folded protruding portions face each other.

5. The radial foil bearing according to claim 1,
wherein the intermediate foil has a hole portion, and an overhanging piece that overhangs to a back foil side from an opening end of the hole portion in a circumferential direction toward a middle portion of the hole portion in the circumferential direction.

6. The radial foil bearing according to claim 1,
wherein the foil structure is supported by an inner peripheral surface of the insertion hole.

7. A radial foil bearing comprising:
a bearing housing which has an insertion hole therein;
a top foil which is disposed inside the insertion hole; and
a foil structure which is interposed between the top foil and the bearing housing,
wherein the foil structure has a folded protruding portion that is bent outward in a radial direction of the insertion hole and is bent back inward in the radial direction,
the folded protruding portion is in contact with an inner surface of a fitting groove formed in an end surface of the bearing housing in an axial direction in an energy storing state and is fitted to the fitting groove, the axial direction being a direction in which the insertion hole extends,
the foil structure includes
a back foil disposed along an inner peripheral surface of the insertion hole, and
an intermediate foil that is supported by the back foil and is in contact with the top foil,
the back foil has the folded protruding portion, and
the intermediate foil has a second folded protruding portion fitted to a space inside the folded protruding portion of the back foil.

8. The radial foil bearing according to claim 7,
wherein the intermediate foil has a hole portion, and an overhanging piece that overhangs to a back foil side from an opening end of the hole portion in a circumferential direction toward a middle portion of the hole portion in the circumferential direction.

9. A radial foil bearing comprising:
a bearing housing which has an insertion hole therein;
a top foil which is disposed inside the insertion hole; and
a foil structure which is interposed between the top foil and the bearing housing, wherein the foil structure has a folded protruding portion that is bent outward in a radial direction of the insertion hole and is bent back inward in the radial direction, the folded protruding portion is in contact with an inner surface of a fitting groove formed in an end surface of the bearing housing in an axial direction in an energy storing state and is fitted to the fitting groove, the axial direction being a direction in which the insertion hole extends, the folded protruding portion is provided at each of end edges of the foil structure on both sides in the axial direction, and the foil structure has a hole portion provided between the folded protruding portions formed at the end edges on both sides in the axial direction.

* * * * *